United States Patent

[11] 3,560,663

[72] Inventors David K. K. Lee;
Don N. Wong, Chicago, Ill.
[21] Appl. No. 795,285
[22] Filed Jan. 30, 1969
[45] Patented Feb. 2, 1971
[73] Assignee Automatic Electric Laboratories, Inc.
Northlake, Ill.
a corporation of Delaware

[54] TRAFFIC CONTROL FOR MODIFYING THE ROUTING PLAN IN A NETWORK OF SWITCHING CENTERS
29 Claims, 13 Drawing Figs.

[52] U.S. Cl. .......... 179/18
[51] Int. Cl. .......... H04q 3/56
[50] Field of Search .......... 179/18.21

[56] No References Cited.

*Primary Examiner*—Kathleen H. Claffy
*Assistant Examiner*—Thomas W. Brown
*Attorneys*—Spencer E. Olson, K. Mullerheim and B. E. Franz

ABSTRACT: A communications network is disclosed wherein the code translation and routing apparatus at each switching center includes a memory having a number of code words and a number of routing words. Each code word stores a code which usually comprises three or six digits used in an associative search by comparison with the corresponding dialed digits. Each code word or group of code words is followed by one or three routing words, each of which designates one or more trunk groups, which may comprise a primary route and a number of alternate routes. Some of the code words include an automatic traffic control digit which directs which one of three routing words is to be used. The value of the traffic digit for each code or group of codes may be modified by a traffic controller by a call from a special station, to thereby designate which one of three predetermined routing plans stored in the respective routing words is to be used. Thus under abnormal traffic conditions caused, for example, by overloads in emergencies, or destruction of facilities, the traffic routing plan may be modified.

FIG. I

INVENTORS
DAVID K.K. LEE
DON N. WONG
BY
Bernard E. Franz
ATTY.

PATENTED FEB 2 1971

3,560,663

SHEET 02 OF 13

PATENTED FEB 2 1971

3,560,663

TRANSLATOR AND ROUTE SELECTOR
120

PATENTED FEB 2 1971

3,560,663

TRAFFIC CONTROL FOR MODIFYING THE ROUTING PLAN IN A NETWORK OF SWITCHING CENTERS

CROSS REFERENCES TO RELATES APPLICATIONS

This invention may be incorporated in the Communication Switching System described in U.S. Pat. No. 3,328,534 by R. J. Murphy et al., hereinafter referred to as the System patent.

Three copending U.S. applications for a Digital Control and Memory Arrangement, Ser. No. 667,170 by H. L. Wirsing and W. C. Miller, filed Sept. 12, 1967; Ser. No. 690,356 by G. P. Minarcik filed Dec. 13, 1967; and Ser. No. 690,348 by D. K. K. Lee, J. R. VandeWege and W. R. Wedmore, filed Dec. 13, 1967, now Pat. No. 3,553,079, hereinafter referred to as the Memory Sharing applications, disclose arrangement of the common control equipment into three subsystems sharing a common memory. A U.S. Application for a Trunk Preference Circuit, Ser. No. 749,131, filed July 31, 1968 by H. L. Wirsing, hereinafter referred to as the Trunk Scanner application, describes an arrangement relating to the busy-idle status of the trunk circuits in the route selector portion of the memory. This System Pat. and these relates copending applications are incorporated herein and made a part hereof as though fully set forth.

BACKGROUND OF THE INVENTION

1. Field of the Invention

This invention relates to traffic control in a network of switching centers, and more particularly to an arrangement for providing any switching center with a number of routing plans for any destination code or set of destination codes.

More specifically, this invention relates to communication networks wherein instrumentalities are employed for minimizing the effects on the network of overloads occurring at individual switching centers servicing the network, or of individual routes or switching centers being fully or partially out of service.

2. Description of the Prior Art

Distance dialing with automatic routing of calls in a network of switching centers, using alternate routing, provides fast efficient service in establishing connections. However, certain abnormal traffic conditions in a communication network may occur as a result of hurricanes, floods, defense emergencies or other similar situations. An overload in one area of an integrated network may adversely affect service in the entire network including those areas that have an appreciable margin of facilities. Arrangements are known for monitoring the traffic conditions at remote points in the network and altering the routing facilities at individual switching centers accordingly. See for example U.S. Pat. Nos. 3,335,229, 3,342,945, 3,394,221 and 3,411,140. The prior art shows arrangements for altering the routing plan at a switching center by techniques such as selective cancellation of alternate routes, or diverting some of the traffic over an additional route not normally used. However, these plans lack full flexibility in modification of the routing plans under different conditions.

SUMMARY OF THE INVENTION

The invention may be incorporated in a switching center in which the routing apparatus includes a code translator having a plurality of code translation stores, each individual to a call directive code (area codes and office codes) to supply routing information for each code or set of codes designating a primary route group of terminations (truck circuits) and alternate route trunk groups with a given order of preference. According to the invention, at least some of the code translation stores include apparatus storing a traffic plan digit having a plurality of possible values, with each value designating a routing plan specifying one or more trunk groups and an order of preference as to which is the primary route, the first alternate, second alternate, etc. Under abnormal conditions, the values of one or more of the individual traffic plan digits may be changed by a traffic controller, to put into effect different routing plans.

The advantage of this arrangement is that the trunk groups used in each routing plan for any destination code or set of codes may be selected independently of the other routing plans, using the same or different trunk groups in any order.

In a specific embodiment of the invention, the code translation stores are individual word stores in a code translation section of a memory, and each routing plan is stored in an individual word store of the memory. Some of the code translation stores include the traffic plan digit, which designates which of the routing plan stores to use. The traffic plan digits may in general be modified by signals from the traffic controller.

GENERAL DESCRIPTION OF THE PREFERRED EMBODIMENT

Figure 1:
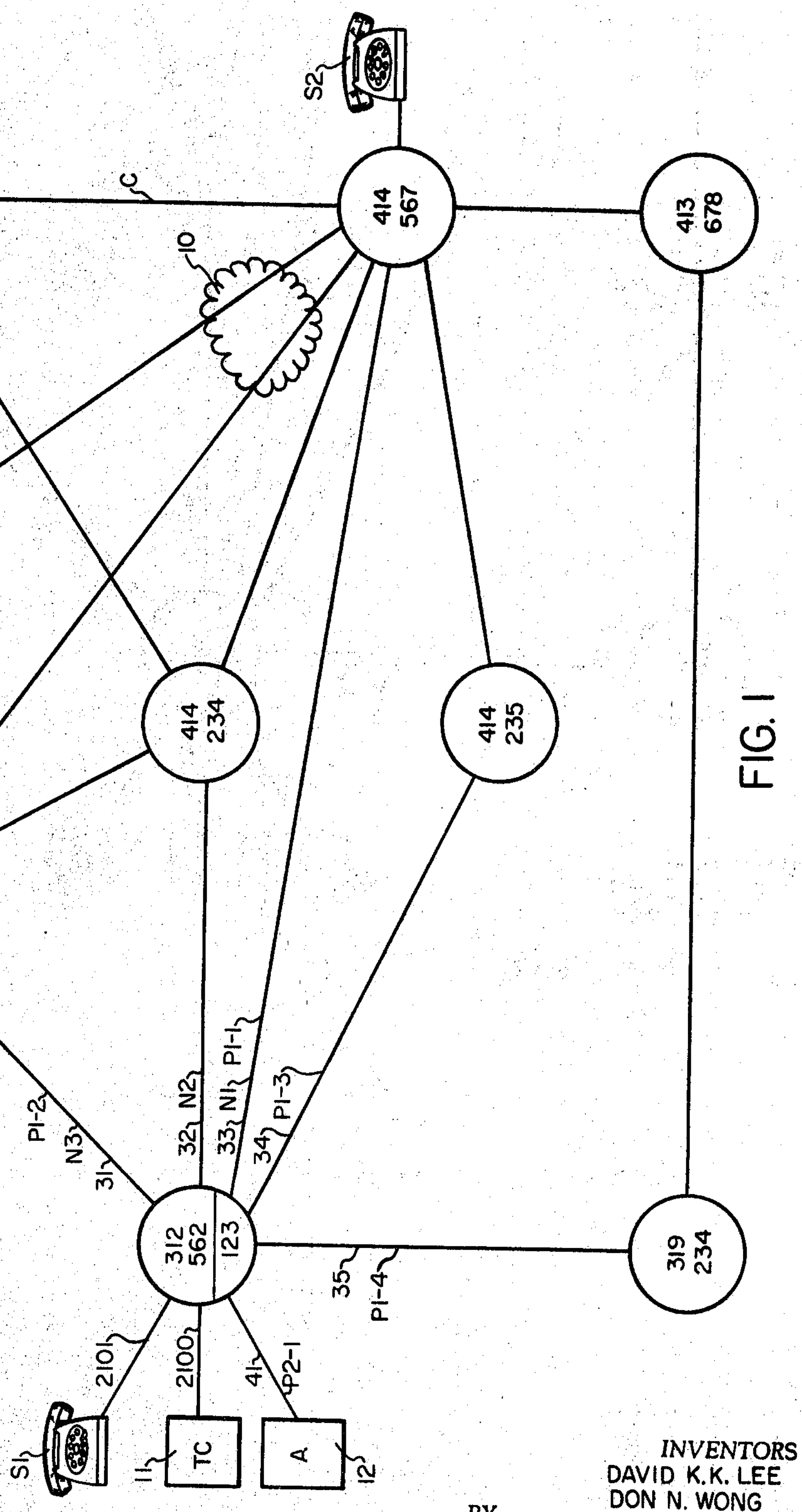
FIG. 1 is a diagram of a communication network showing switching centers interconnected by trunk routes.

The system incorporating the preferred embodiment may be described generally with reference to FIGS. 1—6. As shown in FIG. 1, a communication network includes a number of exchange switching centers, hereinafter referred to as switches, shown as circles, each designated by a three-digit area code and a three-digit switch code. One of these switches is shown in block diagram form in FIG. 2. It includes a switch matrix 301 for interconnecting a number of termination circuits. Some of these termination circuits such as 2101 serve subscriber lines, some such as 3100 serve interoffice trunks, some such as 9001 and 9101 serve as register-sender junctors, and others such as 1601 serve service lines such as announcement trunks. Although some of the termination circuits are shown on the left side of the matrix and others on the right side, each termination circuit, in fact has an appearance on both sides of the matrix, and any termination circuit may be connected to any other. The switch matrix is operated by a switch marker 302. The switch includes a central processor 100 connected via conductors J to the register-sender junctors and by a multiconductor data bus DB to the marker. The central processor 100 also includes a trunk scanner connected to the termination circuits via the set of conductors 131.

Figure 3:
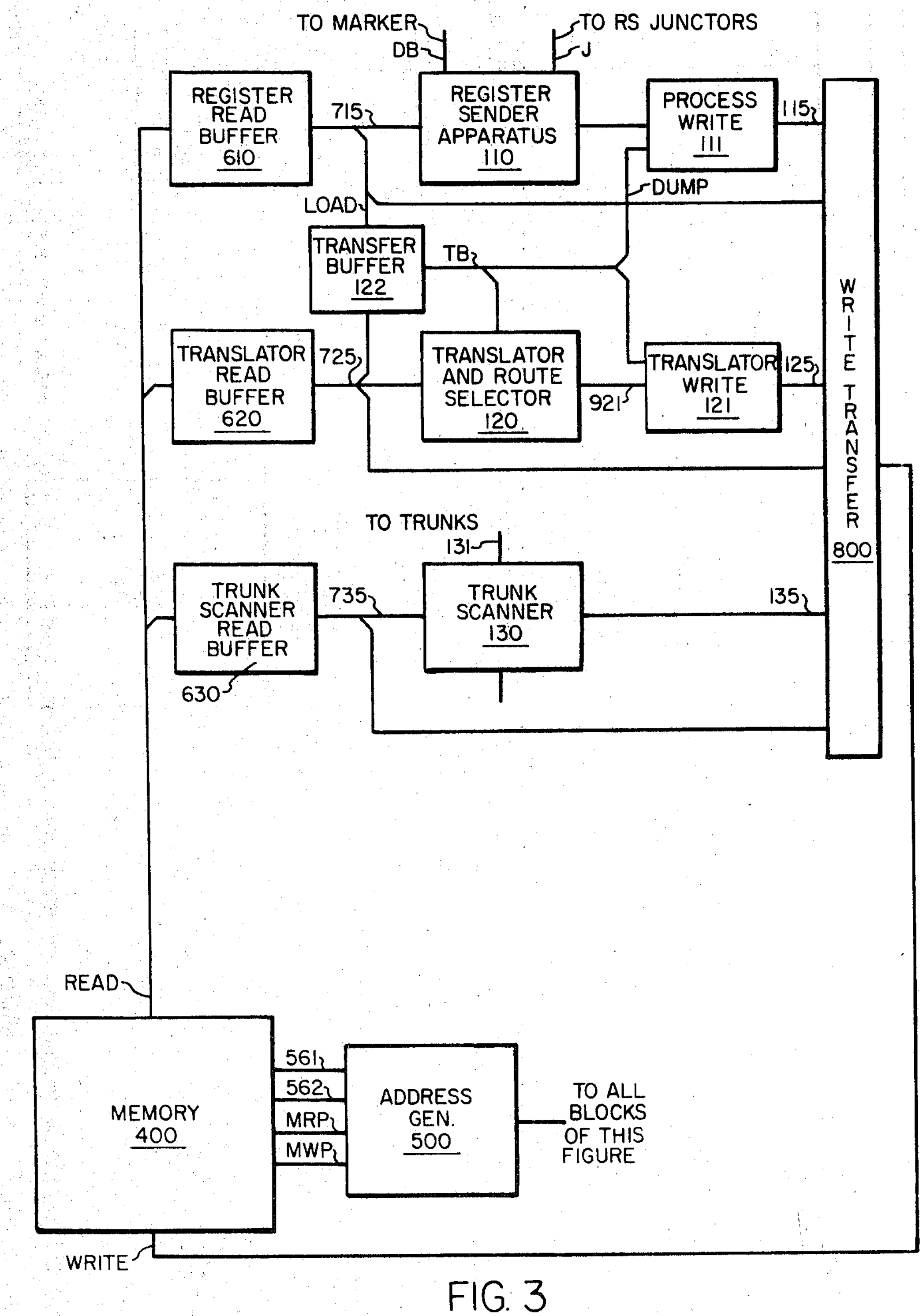
FIG. 3 is a block diagram of the central processor of the switching center shown in FIG. 2.
Figure 4:
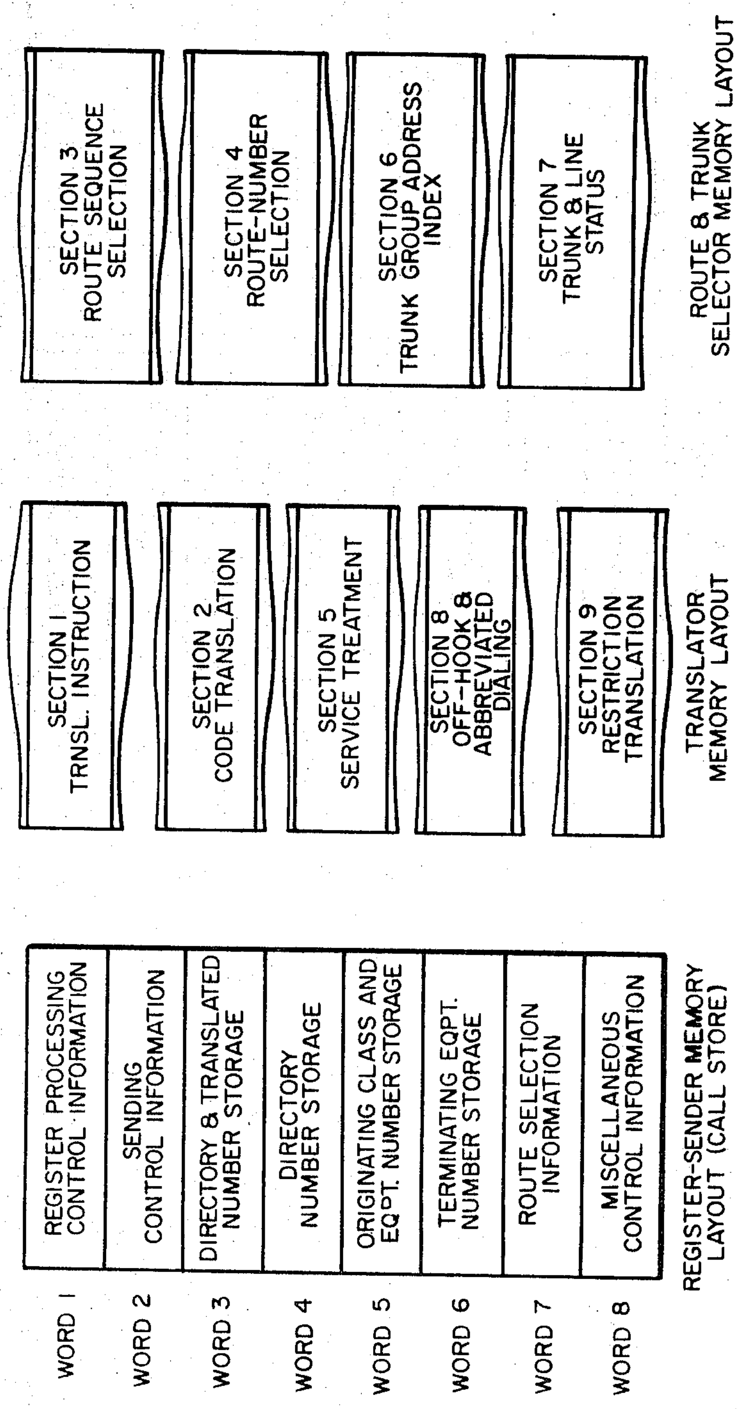
FIG. 4 is a layout arrangement chart of the memory of the central processor.

The central processor 100 is shown in block diagram form in FIG. 3. It comprises three subsystems which are the register-sender apparatus 110, a translator and route selector 120, and a trunk scanner 130. These subsystems share a common memory 400, using respective read buffers 610, 620 and 630. A transfer buffer 122 provides for the transfer of information between the register-sender subsystem and the translator and route selector subsystem. A common address generator 500 supplies timing signals and addressing signals to the memory 400, and to all of the subsystems of the central processor. For the rewriting of information into the memory the three subsystems share a write transfer circuit 800. To modify the information in memory, the register-sender subsystem uses a process wire write circuit 111, and the translator and route selector subsystem uses a translator write circuit 121. The operation of these three subsystems with the common memory is described in said Memory Sharing applications The memory 400 is a destructive read ferrite core memory having 44 cores per word store, and the address generator 500 provides for access of one word store at a time either randomly or sequentially. The layout plan of the memory is shown in FIG. 4. A number of word stores of memory are dedicated to 24 register-sender junctors served by the register-sender subsystem, each register-sender junctor having eight word stores of memory as shown by the first column of FIG. 4. These word stores are addressed in cyclically recurring time slots and subtime slots. The translator and route selector portion of the memory comprises nine sections as shown in the second and third columns of FIG. 4 arranged generally for random access, with some portions accessed sequentially for associative searches.

Figure 5:
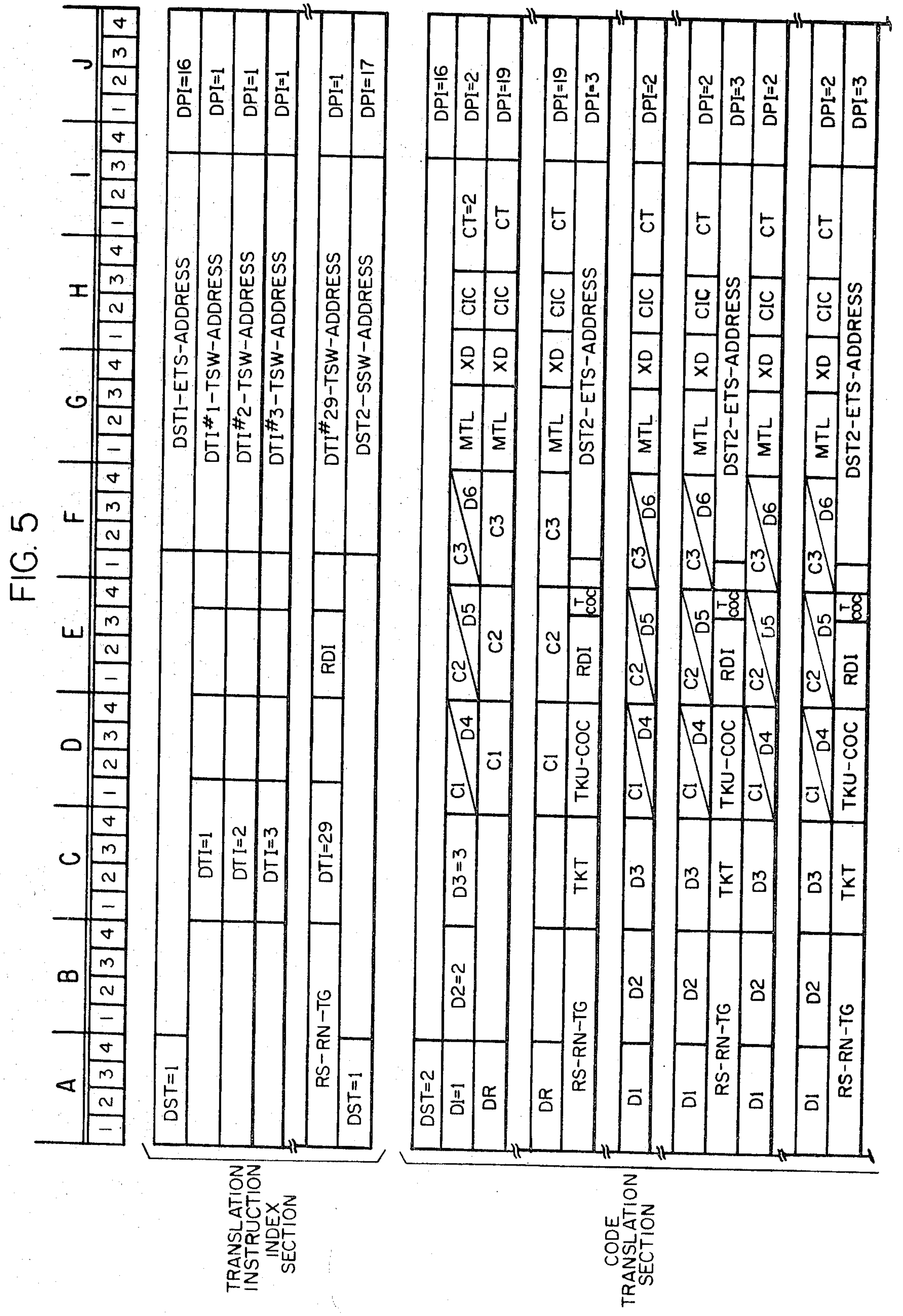
FIGS. 5, 6 and 7 are diagrams of various portions of the memory, showing the format of information stored in certain words thereof.
Figure 6:
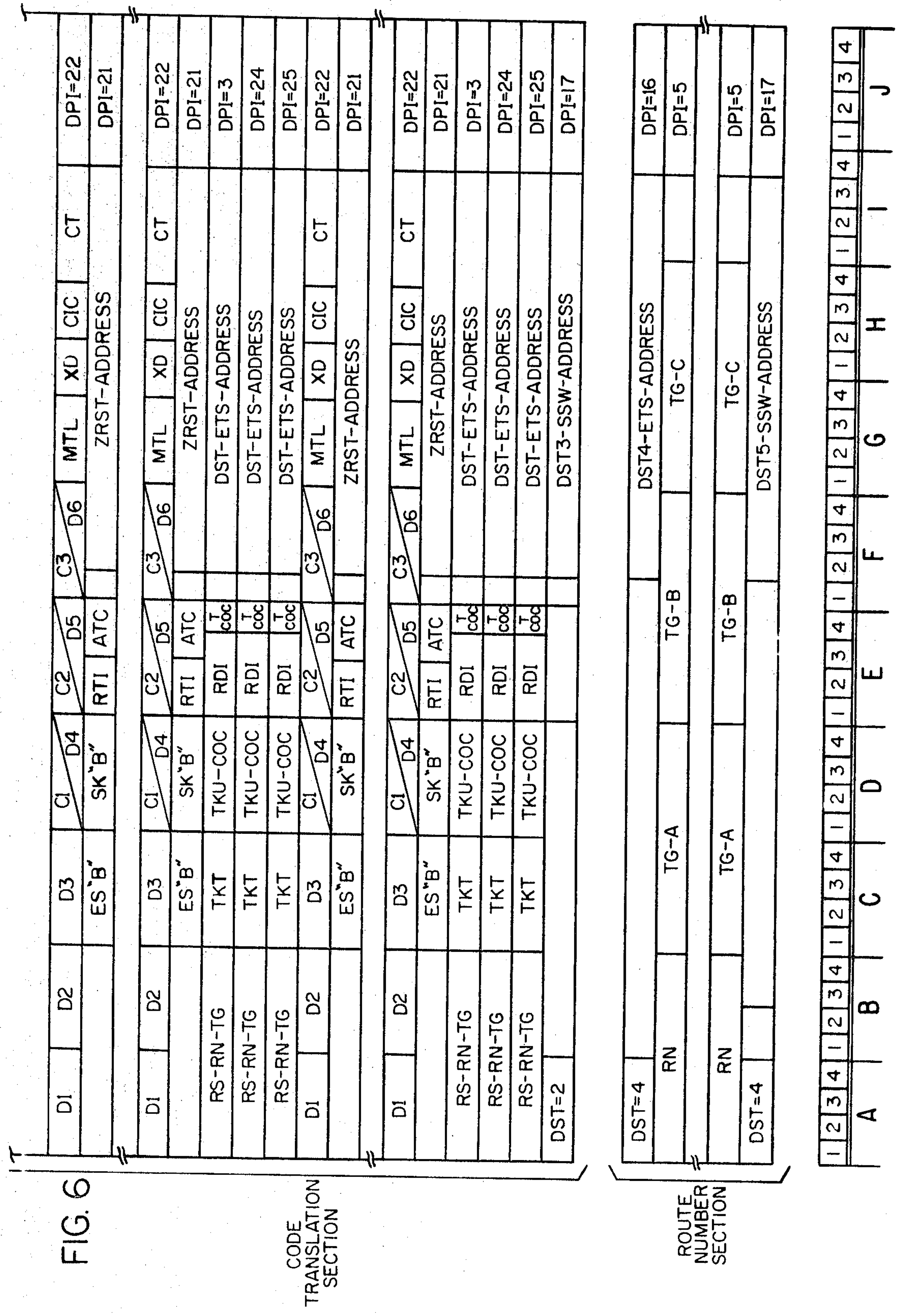

The format of three sections of the translator and route selector portion of the memory is shown in FIGS. 5 and 6, with FIG. 5 placed above FIG. 6. The format of the translation instruction index section 1 is shown at the top, the format of the code translation section 2 is shown bridging FIGS. 5 and 6, and the route number section 4 is shown at the bottom of FIG. 6.

The format of every word store of the memory comprises 10 positions of four bits (binary digits) designated A—J, and four parity bits not shown. In the translator and route selector portion of the memory the last five bits I4—J4 store a process instruction, and the decoded value DPI is shown in the format. This process instruction designates how the information from memory is transferred from the translator read buffer 620 to flip-flops in the transfer buffer 122, and what action is to be taken by the translator and route selector logic 120. The process instruction is also used in associative searches, in which certain digits stored in the word stores of the memory are compared with digits stored in the transfer buffer.

The code translation section of the memory comprises principally two types of words, number plan code words having process instruction DPI values of 2, 22 and 21; and route selection control words, hereinafter referred to as routing words, having process instruction DPI values of 3, 24 and 25. Each DPI2 and 22 word stores a one- to six-digit number plan code (area and/or switch code) in the positions A through F as indicated by the designations D1—D6. Each of these word stores also stores various control information, and may store code convert digits C1—C3 is in positions D—F if these positions are not used for number plan code digits. Each DPI22 word store is followed by a second word store DPI21 for additional control information. Of particular interest is a traffic plan digit ATC in each DPI21 word in the bits E3 and E4 which controls the selection of a routing plan word. The routing plan word stores, such as the DPI3 word stores, store information which effectively designates from one to 18 trunk routes which are tested in order to find an available trunk for routing of a call.

The DPI3 words are normal plan routing words, and the DPI24 and 25 words are for routing under abnormal conditions. The selection of a routing word is controlled in accordance with the value of the ATC digit in the DPI21 words. When the ATC digit has a value of one the plan 1 routing word DPI24 is selected, and when the ATC digit has a value of two the plan 2 routing word DPI25 is selected. The value of the ATC digit may be changed by a traffic plan controller as described below.

The routing word stores may be individual to single numbering plan word stores, or may be common to a number of numbering plan word stores.

The translation and routing means includes the memory sections 1—7 in the last two columns of FIG. 4; and processing apparatus which includes the translator and route selector 120, the transfer buffer 122, the translator read buffer 620, and the translator write circuits 121. Part of the processing apparatus is traffic plan control apparatus used to control modification of the traffic plan digits.

GENERAL OPERATION OF THE SYSTEM FOR A TYPICAL CALL

Figure 2:
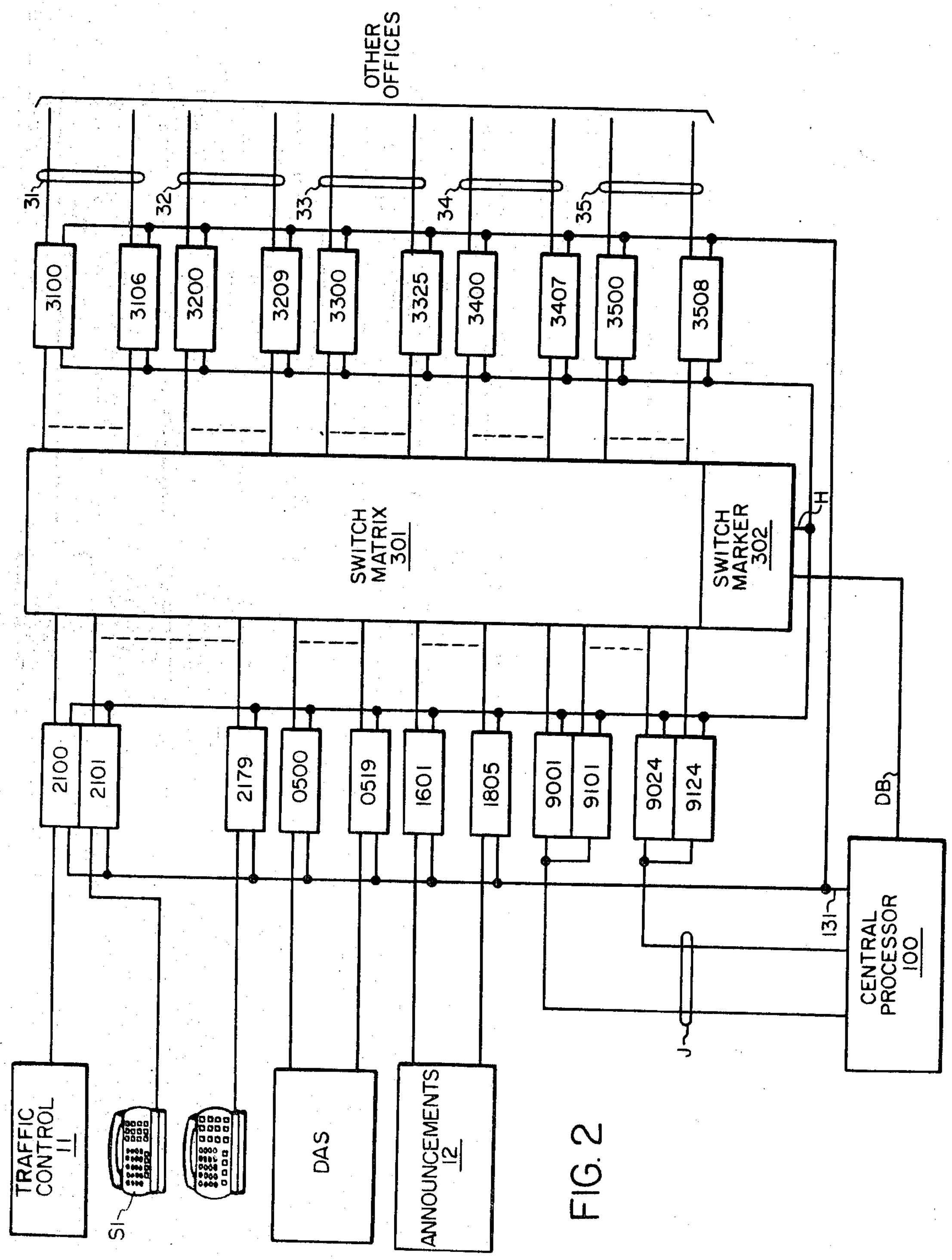
FIG. 2 is a block diagram of one switching center of the network.

A brief general description of the operation of the system will be given by describing a typical interoffice call with reference to FIGS. 1—6. Assume that the party at station S1 served by switch 312-562 lifts his handset to initiate a call. Referring to FIGS. 2 and 3, the service request signal from the station S1 is repeated via the termination circuit 2101 and conductors of highway H to the switch marker 302. The switch marker identifies the equipment number 2101 of the calling station and forwards the information via conductors of the data bus DB to the register-sender apparatus 110 of the central processor 100. The register-sender apparatus selects an idle register junctor such as termination circuit 9001 and returns this information via bus DB to the switch marker 302, which causes the switch matrix 301 to establish a connection between the termination circuits 2101 and 9001.

Referring to FIG. 4, the calling line equipment number 2101 is stored in word store 5 of the selected register junctor. The register-sender apparatus forwards a request signal to the translator and route selector 120, (FIG. 3) which when idle causes a translation instruction and originating equipment number to be transferred from the register read buffer 610 into the transfer buffer 122. The translator makes an associative search in the translation instruction index section 1 for the word corresponding to the translation instruction, and reads an address from bits F2—I3 which directs it to the beginning of section 5 of the memory. The translator then searches this section for the word having the originating line equipment identity, and when it is found reads the class of service information via the translator read buffer 620 into the transfer buffer 122. From section 5 an address is obtained for the beginning of section 6 of the memory where a search is again made for the originating identity number to obtain the address for this trunk group in section 7. In section 7 the words for this trunk group are searched to find the originating equipment number, and the translator writes into this word store to indicate that the line is originating busy. The translation is then complete and the originating class information is dumped via conductors DUMP from the translator buffer 122 and the process write circuits 111 and write transfer circuit 800 into the memory 400, into word store 5 of the register junctor.

The register junctor then returns dial tone, and the addressing digits may be received. The called station S2 is served by switch 414-567 and may be assumed to have a station number 1111, so that its directory number is 414-567-1111. The received digits are stored in word store 4 of the register junctor. There is a priority upgrade translation which is not of interest here.

After digits D1—D3 of the directory number are received the register sender apparatus 110 requests a code translation. The translator causes various information including a translation instruction and the digits from word store 4 to be transferred via the register read buffer 610 to the transfer buffer 122. The translation instruction word store in section 1 of the memory contains the address of the beginning of the code translation section 2. The translator searches the DPI2 and 22 words for the three-digit code. This word store contains information indicating that more digits are required and completes the translation, dumping instructions into word store 1 of the register junctor indicating the number of digits required.

In this call, when all digits are received, translation is again requested and the same code translation instruction along with six dialed digits D1—D6 are loaded into the transfer buffer 122. In this case, assume that the code is located in a DPI22 word store. The information from this word store and the following DPI21 word store is loaded into the transfer buffer 122. Assume that this information includes an ATC digit having a value of zero, which indicates that the routing information should be obtained from the next DPI3 word store. The address is advanced until a DPI3 word is found and the information is loaded into the transfer buffer 122. Positions A and B of this word contain trunk group routing information directing the translator to section 3, section 4 or section 6 in accordance with the value of a route digit indicator digit RDI in bits E1—3, along with the appropriate start word address of that section in bits F2—I3. Assume in this case that section 4 is designated, which case a "route number" is read from positions A and B. The translator looks up this number in positions A and B of the route number section 4 of the memory, where the identities of three trunk groups are stored in positions C—H. Referring to FIG. 1, assume that the normal plan routing for this destination comprises trunk groups 33, 32 and 31 in that order. The translator will read the first trunk group identity 33 from positions C and D and advance to section 6 to find the section 7 address for this trunk group. In section 7 the trunk group memory is searched for an idle trunk. Assume that in this case all trunks are busy, which causes the translator to return to section 4 and to read the identity of the next trunk group 32 from positions E and F. The translator then again looks in section 6 for the trunk group address and in section 7 searches this trunk group for an idle trunk. Assume that it finds the trunk having the equipment number 3200 (FIG. 2) idle and selects it. This trunk identity is then transferred via conductors DUMP from the transfer buffer 122 and the process write circuits 111 and write transfer circuit 800 into the memory word store 6 of this register junctor. The route selection information is also loaded into word store 7, and other miscellaneous information is loaded into other words stores for control of the register sender.

The register-sender apparatus 110 supplies the originating equipment number and register junctor equipment numbers to the switch marker 302 via conductors DB to release the connection to the register junctor; and supplies information to cause a connection to be established from the sender junctor 9101 to the outgoing trunk termination circuit 3100. After completion of sending this connection is released, and the register sender supplies via conductors DB the identify of the termination circuits 2100 and 3100 to the switch marker 302 to cause a connection to be completed between them. The word store in memory for this junctor is then cleared and it is returned to idle status.

AUTOMATIC TRAFFIC CONTROL

Automatic traffic plan control provides for putting into effect different routing plans according to conditions. The basic reasons for automatic traffic control are to reroute traffic in heavy traffic or adverse weather conditions, to route traffic to an announcement trunk should the destination switch be inoperative, to route traffic to an operator in an emergency, or to cancel alternate routes selectively or modify the alternate route plan should the network become overloaded.

Automatic traffic plan control can be activated or deactivated only from a traffic plan control line. This line is provided with a telephone at a station 11 which is similar to that at other subscriber lines, but is provided with a specifically marked termination 2100 (FIGS. 1 and 2), to provide control instructions to the switches. The system is arranged so that the traffic plan control station is located within the numbering plan area of the switches to be controlled. The class of service treatment mark of the traffic plan control station is uniquely assigned for that line. This allows the traffic plan controller to perform automatic traffic plan control, and prevents any other line from originating traffic plan control instructions.

As noted above, traffic plan control is accomplished by assigning three preprogrammed routing plans to an area and/or switch code, or group of such codes, in the code section of the translator memory, these routing plans being word types DPI3, DPI24, and DPI25 respectively. Which one of the three preprogrammed routing plans is to be used during route selection is governed by the traffic plan indicator ATC for that code in the DPI21 word. For the normal routing plan the ATC digit has a value of zero or three. The value of zero can be modified to one or two at any time by the traffic plan controller, while the value three cannot be modified. The values of one and two for the ATC digit indicate to the route selector to select the preprogrammed traffic routing plan one or two respectively, in the DPI24 and 25 words respectively.

The digit pattern dialed by the traffic plan controller includes priority and route digits, a special three-digit code designating the switch in which the modification is to be effected, and six digits designating the code word store in memory to be affected, and a seventh digit, which is arbitrarily designated a Z digit which is the instruction as to how to modify the ATC digit. If a three-digit area of switch code word store in memory is being affected, the three digits are repeated to fill out the six digits, so that the Z digit is seventh.

The ATC digit may be changed in the DPI21 word for a single code, or in all of the DPI21 words of a group of codes which appear in the memory before the routing words for the group. The digits having a value of one, two or four are used to change the ATC digits for an entire group of codes, while the digits having a value of five, six or eight are used to change the ATC digits for only the code in the dialed digit pattern from the traffic controller. For other values of the Z digit the call is routed to an announcement trunk. A Z digit equal to one changes the ATC digit to the value of one for plan number 1, a Z digit equal to two changes the ATC digit to two for plan number 2, and a Z digit equal to four changes the ATC digit to a value of zero for all code words from the dialed code to the end of the code group. A Z digit equal to five changes the ATC digit to a value of one for plan number 1, a Z digit equal to six changes the ATC digit to two for plan number 2, and a Z digit equal to eight changes the ATC digit to zero for the normal plan, for the dialed code only.

For traffic plan control, each switch in a numbering plan area is given a special three-digit code starting with the digit one. For example referring to FIG. 1, in numbering plan area 312 the switch 562 has a traffic plan control code of 123, switch 379 has a traffic plan code of 124, and switch 297 has a traffic plan code of 125.

The general operation of the translator for automatic traffic plan control is such that up to the time before the first code translation the call is processed as a normal call. The service treatment mark obtained from section 5 of the memory and stored in word store 5 of the register junctor indicates that the call originated at the traffic plan control line.

On the first code translation, if an automatic traffic plan control code is detected by the translator, it will from that point on, act as a control plan implementation device. In the originating switch, namely switch 312-562 (FIG. 1) a check is performed to verify whether the originating line is a traffic plan control line. If the call does not have the appropriate class mark, the call is routed to an announcement trunk. If the class mark is correct, the translator examines the code further in order to determine whether it is a local traffic plan control or an extended area code. The code type is checked by a digit which appears in the DPI2 and 22 words in bits H4—I3 shown in FIG. 5 by the letters "CT," which for the local traffic plan control code has the value of two, and for the codes of other switches has a value of six or 14.

For a local traffic plan control code, the code word store in the code translation section of the memory is at the beginning of the section. Referring to FIG. 5, the first DPI2 word has the dialed digits D1—D3 equal to 123 in positions A—C. The code-type digit H4—I3 has the value of two. There is no routing word associated with this code word. The translator upon reading this word and verifying the originating class mark, sets a special flip-flop designating that an automatic traffic plan control is in process, and completes the translation, requesting the register-sender for more digits. The information that this is an automatic traffic plan control call is also forwarded to the register-sender and stored in a bit in word store 8. The register-sender deletes the traffic plan code 123 from the digit positions D1—D3, so that the following digits are stored starting with position D1.

On the next code translation, when coincidence is found of the digits D1—D3, the translator determines whether it is a three-digit code or a six-digit code that the traffic controller wants to be affected If it is a six-digit code the translator requests the register-sender to return with all of the dialed digits. Then when the six-digit coincidence is found the translator steps to the next address which is a DPI21 word, and writes into bits E3 and E4 of the memory via the translator write circuits 121 and write transfer circuits 800 the new value of the ATC digit as designated by the value of the Z digit. If the value of the Z digit designates that a group of code words are to be affected, it writes the value into the ATC digit of all of the DPI21 word stores until it reaches the address of a DPI3 word.

By way of example, referring again to FIG. 1, the routing plans from the switch 312-562 where the destination code 414–567 includes a normal plan in which first choice is trunk group 33, the first alternate is group 32 and the next alternate is group 31. In the code translation section in a DPI22 word in which the positions A—F store the digits 414-567, which is followed by a DPI21 word, and possibly several other pairs of DP 122 and 21 words, there are three routing words DP12, DPI24 and DPI25. As already noted, in the DP13 word the routing information refers to a word store in the route number section storing the designations of the three trunk groups. Assume that for plan one the route 32 is to be canceled and two additional trunk groups 34 and 35 are to be made available, in other words group 33 is the primary route and the alternate routes in order are group 31, group 34 and group 35. In this case the DPI24 word store would store a route sequence number referring to section three, where two route numbers would be stored, and in section four of the memory the first of these designated route numbers would store the first three trunk groups and the second would store the last trunk group. This plan might be used for example if the switch 414-234 was carrying an overload of traffic. The plan two for the destination code 414-567 might be a single trunk group to announcement circuits 12, for example trunk group 41. Then in the DPI25 word the information stored would be simply the designation of that trunk group. This plan 2 might be used for example if the destination switch 414-567 were out of service for any reason and therefore the call could not be completed in any case.

The traffic plan controller at station 11 can also modify the ATC digits in the code translation sections of the memory of other switches in the same numbering plan area, for example switches 312-379 and 312-297 in FIG. 1. These switches are given the special traffic plan control codes 124 and 125 respectively.

In this case the originating switch verifies that the call is originated with the appropriate class mark, and then processes the call as a normal call. In any tandem switch the call is processed as a normal call. In the terminating switch designated by the dialed traffic plan control code, the call is processed as a traffic plan control call as described above for the local code, except that no verification of proper origination is made, since it is assumed that this was done in the originating switch.

By way of example, assume that it is desired to have traffic plan control to provide for the contingency of the direct trunk groups from switches 312-379 and 312-297 to switch 414-567 being out of service, as indicated by 10 in FIG. 1. Then the plan No. 1 word for the code 414-567 at switch 312-379 may designate trunk group A as the primary route, and at switch 312-297 the plan No. 1 word may designate trunk group B as the primary route. Then any calls originating on tandem via these offices with the destination 414-567 would be routed via switch 414-464 and trunk group C.

While the automatic traffic plan control system has been described using manually originated calls from the traffic plan control station 11, acting in accordance with information received in same manner; it is clear that the apparatus at the station 11 could be arranged for online control, with equipment to measure traffic conditions and other information at the other offices and forward ,it via switched or dedicated trunk links to the traffic control station, which would responds thereto to automatically originate calls to modify the ATC digits in the code translation section of the memory.

DETAILED DESCRIPTION OF THE PREFERRED EMBODIMENT

The digital control and processing circuits include flip-flop storage devices, and various logic gates, as shown in FIGS. 10—13. Each of the flip-flops includes two transistors in a bistable circuit configuration. Each flip-flop has eight input terminals and two output terminals. To set a flip-flop to state one, producing a true indication, requires coincidence of a signal on a DC input and a trigger pulse on an AC input; and in like manner to reset it to state zero, indicating a false condition, requires coincidence of a DC input and an AC input. The flip-flops are shown in the drawings as having the inputs on the left-hand side with one or two small coincidence gates on the upper half to set the flip-flop and one or two similar coincidence gates on the lower half for reset. Each such coincidence gate is shown with the AC or trigger pulse input at the center of its left side, and the DC or control input at the top or bottom. Some of the coincidence gates are omitted from the drawing. The outputs are shown with the state one output at the top and the state zero output at the bottom on the right-hand side.

Gated pulse amplifiers are shown as triangles with four input leads on the base on the left-hand side and an output at the apex on the right-hand side. The upper input on the left-hand side is a capacitance-coupled trigger pulse input terminal, and the other three inputs are for DC control inputs. The circuit is arranged so that unused DC inputs do not have any effect on the operation. If there is a connection shown only to the second input lead the signal thereon when true enables the amplifier to pass the pulse supplied to the upper input. If there are connections to the second and third inputs, they act as an AND circuit so that only when both of these inputs are true is the amplifier enabled to pass the pulse at the upper input. If there is also a connection to the lower input it acts as an OR circuit with the other control inputs so that when it is true it enables the amplifier. If the gated pulse amplifier has a connection only to the upper input then it always passes a pulse supplied thereto.

The logical operations are performed by direct coupled resistance-transistor logic in the form of NOR gates. However, for simplicity of disclosure the gates in the drawings are shown as being either AND gates as indicated by a line across the gate parallel to the base, or as OR gates indicated by a diagonal line.

Typical schematic diagrams of these circuit elements are illustrated in FIG. 78 of U.S. Pat. No. 3,301,963 to Lee et al.

In this system the true condition of a signal, the one state, is represented by a negative 8-volt potential; while the false condition of a signal, the zero state, is represented by ground potential.

The central processor 100 is organized to process individual calls via the register-sender junctors. Referring to FIG. 2, the termination circuit 9001 is a register junctor, the termination circuit 9101 is a sender junctor, and the pair comprises a register-sender junctor. There are 24 such register-sender junctors, each having an individual area in the memory 400 (FIG. 3). The register-sender apparatus 110 is multiplex shared by these register-sender junctors in cyclically recurring time slots.

The translator and route selector 120, when idle, may be seized for a call being processed for any register-sender junctor during its time slot, and the transfer buffer 122 loaded from the register buffer 610. In a later occurrence of the same time slot, information is dumped from the transfer buffer via the process write circuit 111 into the area of memory for that register-sender junctor, and the translator and route selector returned to idle.

In the description which follows the term "register-sender junctor" may be shortened to "register junctor" or simply "-junction," and includes the individual area of memory as well as the pair of termination circuits.

MEMORY FORMAT

The arrangement of the memory system and the addressing technique for access thereto is described in said Memory Sharing applications. The general format plan of the memory is shown in FIG. 4, which corresponds to FIGS. 26—28 of said System patent, described in columns 37—40 thereof.

Each register-sender junctor has eight word stores of memory. During the time slot of each junctor, there are 10 subtime slots, the first eight subtime slots being used to access the eight word stores in sequence, and the subtime slots 9 and 10 being used for a repeated access of word stores 1 and 2 respectively.

The first word is the register-processing control word; it contains information as to call progress, translator access controls, and other information. The second word is the sending control word; such information as digit being sent, mode of sending, how many digits are to be sent, what type of start signal indicator is to be given, etc., is contained in it. The third and fourth words contain the storage for the incoming address information; 10-digit directory numbers plus a route code and a priority digit may be stored. Word three may also store prefix and code convert digits from the translator. The fifth word contains originating equipment identification, as well as the originating service treatment markings that are obtained as a result of service treatment translation. The sixth word contains the terminating equipment identification that is obtained as a result of translation. It also includes some miscellaneous information such as the class of call for operator calls. The seventh word contains route selection information to be used when reroute translation is required. The eighth word contains miscellaneous control information, including one bit to indicate that an automatic traffic control call is in progress.

The translator and route selector portion of the memory contains nine sections as shown in FIG. 4. The format of some of these sections is shown in more detail in FIGS. 5—7. The first word of each section has a processing instruction in bits I4—J4 with a value of 16, and the last word has a process instruction value of 17. These word stores have the section number stored in position A. Each of the section start word stores has the address of the word of the end of the section stored in bits F2—I3; and the last word store of each section has the start word of the following section stored therein.

Section one is the translation instruction section, and has one word for each translation instruction. The value of the translation instruction is stored in bits C1—D1 with values from 1 through 29. Bits F2—I3 store the starting address for each type of instruction. For translation instructions having a value greater than 16, the word also contains route sequencing instructions directly, similar to routing words in the code translation section as described below. Of particular interest herein are the decoded translation instruction DTI1 for originating class mark look-up, giving the start address of section five; instruction DTI3 for code translation, giving the start address of section two; instruction DTI19 for a violation translation (i.e. precedence, route digit, community of interest), giving routing information for a violation announcement trunk; instruction DTI27 for a code violation or no such code translation, giving the routing information for an appropriate announcement trunk; and instruction DTI29 for automatic traffic control, giving routing information for an announcement trunk to inform the traffic controller that the ATC digits have been modified in accordance with his instructions.

Section two is the code translation section, which provides the switch with its code and directory number translation ability. From one to six digits may be translated and each code may be given a unique translation, or a group of codes may be provided with a common translation. With each code there are stored control instructions that allow preliminary three-digit translations to occur. These instructions may include the number of digits to be expected on a call, an identifying mark that tells whether the code is local or foreign area, and other information. Code conversion digits are also provided, and sender instructions are provided on a per code basis, when needed. Associated with each group is one or more route control words that provides the translated routing information.

Each code of the numbering plan has one word with a process instruction of DPI2, or two words with process instructions of DPI22 and DPI21 in sequence. The code translation section is shown in detail on FIGS. 5 and 6. One- through six-digit code translation can be contained in each DPI2 or DPI22 code word. The digits of the code are stored in positions A through F. Positions D—F may also store three code convert digits if code conversion is required for the code.

In each code word store the bits G1—G3 store a memory totals digit MTL, which informs the translator and route selector whether there have been sufficient digits to route, and if not how many digits the register has to accumulate and bring back to the translator for the next code translation. When the totals digit MTL has a decoded value of DMTL2 it is an instruction to the register to delete digits D1, D2 and D3 and after again receiving three digits in these positions to request another translation. A value of DMTL3 is an instruction to wait for storage of digits D1—D7 and to take digits D1—D3 for translation. A value of DMTL4 is an instruction to wait for storage of digits D1—D10 and to take D1—D3 for translation. A value of DMTL5 is an instruction to wait for storage of D1—D10 and take D1—D6 for translation. A value of DMTL6 is an instruction to wait for storage of D1—D7 and to take D1—D6 for translation. A value of DMTL7 indicates that this is sufficient digits to route, and the translator proceeds to route selection.

The digit XD in bits G4 and H1 indicates whether the code convert digits C1, C2 and C3; or the home area code prefix for routings via foreign area route, digits P1, P2 and P3; or both code convert and prefix of home area code are required.

The community of interest digit CIC in bits H2 and 3 indicates which one of any of several communities of interest the destination designated by the code is in.

The code-type digit CT in bits H4—I4 indicates whether the code is a local code or a tandem route or outgoing code, and other information as to the type of the code. Code type DCT2 is the local automatic traffic control code, and code types DCT6 and DCT14 are outgoing or tandem automatic traffic control codes.

The DPI21 code word which always follows the DPI22 code word gives additional information concerning a code, principally relating to zone restriction and sending instruction. This word store also contains the automatic traffic control digit in bits E3 and 4, which indicates which one of the routing words which follows is to be used.

The routing (route selection control) words have processing instruction values of DPI3, DPI24 or DPI25 for normal plan routing, plan one routing and plan two routing respectively. The format for all of the routing words is the same. Positions A and B designate the tens and units digits of either a route sequence RS, a route number RN, or a trunk group TG. For some routings the positions C and D contain the trunk number tens and units digits. On operator calls the bits D2—4 contain the class of call digit COC. The type of routing digits contained in positions A—D is designated by the route digit indicator digit RDI in bits E1—3. An RDI digit having the value of DRDI1 indicates that positions A and B contain the route sequence number RD, a value of DRDI2 indicates that positions A and B contain the route number RN, a value of DRDI3 indicates that positions A and B contain the trunk group number TG, a value of DRDI4 indicates that positions A—D contain a trunk group number TG and trunk number TK, and a value of DRDI5 indicates that positions A and B contain the trunk group number and C contains the trunk tens number.

Bit E4 indicates whether to take the class-of-call digit from bits D2—4 for a call to an operator. Bits F2—I3 contain the address of the end of section two.

The code translation section two also contains DPI19 words which give routing information for situations in which a routing digit is dialed. Position A is used for coincidence with the routing digit on the associative search, and the other positions of the word are similar to a DPI2 word.

Sections three and four of the memory are used for route selection, to designate a number of trunk groups and an order of preference which may be used for a routing. The format of section four is shown in FIG. 6 at the bottom. The words in this section are designated by a processing instruction DPI5. Positions A and B contain the tens and units designation of a route number for an associative search, and positions C—H contain the tens and units digits of three trunk groups designated A, B and C.

The format of section three has a similar format for route sequences, with positions A and B giving the tens and units digits of the sequence for associative search, and positions C—H giving the values of route numbers; however, there may be two words for each route sequence with the first word indicated by a one in bit I3 and the second word indicated by a zero therein. Thus each route sequence may have up to six route numbers, and since each route number designates up to three trunk groups, there is in effect up to 18 trunk groups for each sequence. The processing instruction has the value of DPI4.

Section five is a service treatment section which provides the originating line or trunk class of service information, and is the source of the information which is stored in word store 5 of the register-sender portion of the memory for each junctor.

Figure 7:
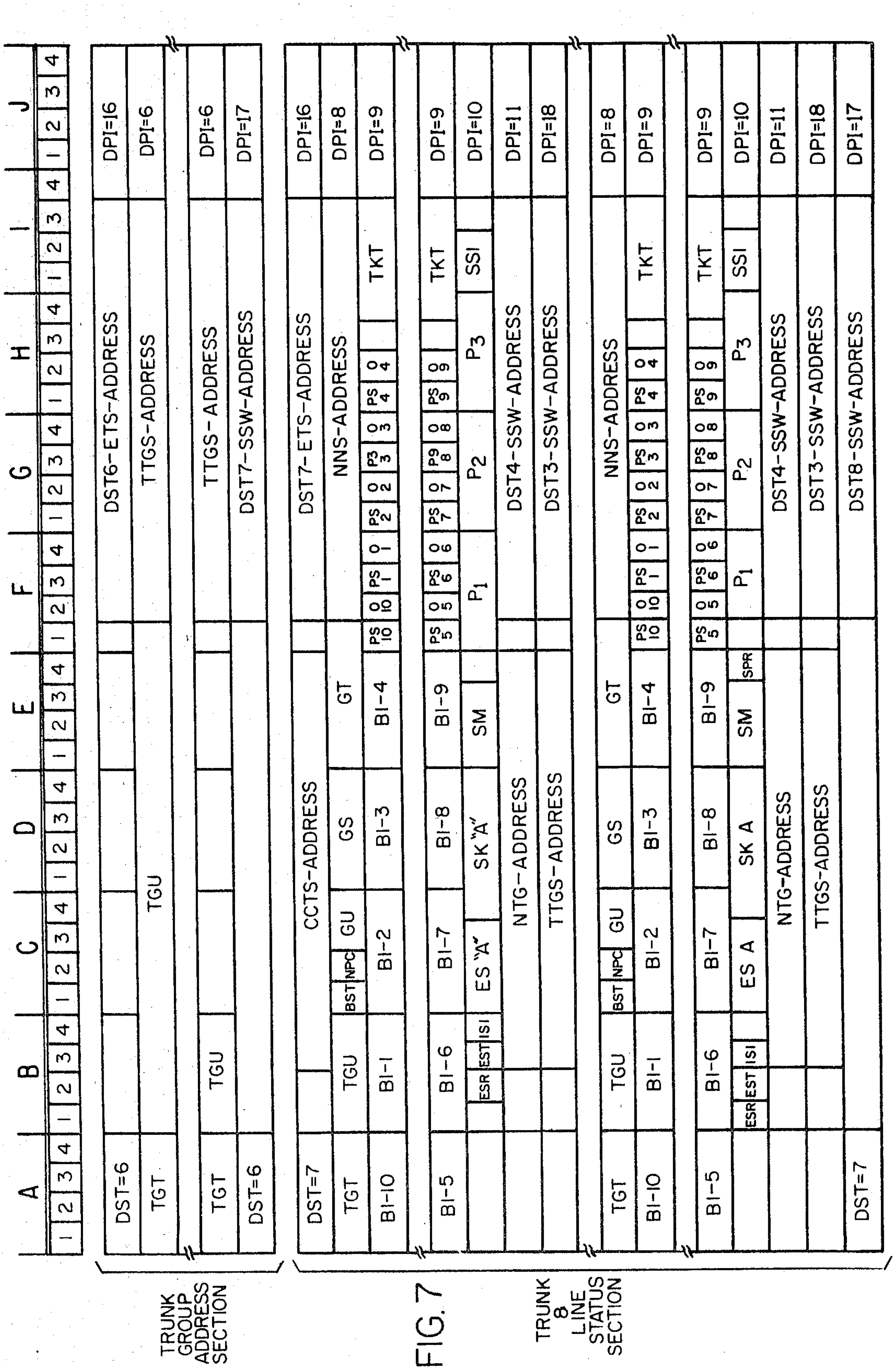

Section six is the trunk group address section for route selection, shown in detail in FIG. 7. This section gives the trunk group tens and units numbers in positions A and B for the associative search, and bits F2—I3 contain the group address for the start of the group in section seven.

Section seven is the trunk and line status section also shown in FIG. 7. The format and operation of the system with respect to this section is described in detail in said Trunk Scanner patent application. The principal words in this section are the DPI9 words, each of which has the busy-idle indicators for five lines or trunks in positions A—E respectively. The trunk tens number is stored in bits H4—I3, and bit H3 has a one to zero to indicate whether it is the first five or the last five trunks of that trunk tens number. For each trunk group the set of DPI9 words is preceded by a DPI8 word designating the trunk group, and followed by DPI10, DPI11 and DPI18 words. The DPI10 word gives sending information and also the prefix digits P1—P3 when required. The DPI11 and DPI18 words give addresses for use in route selection. In the DPI11 word bits B3—E4 give the address of the next trunk group and bits F2—I3 give the starting address of section four. In the DPI18 word bits B3—E4 give the start address of the same trunk group which is a DPI8 word, and bits F2—I3 give the start address for section three.

Section eight is the off-hook and abbreviated dialing section, and section nine is the zone restriction table section.

TRANSFER BUFFER

Figure 8:
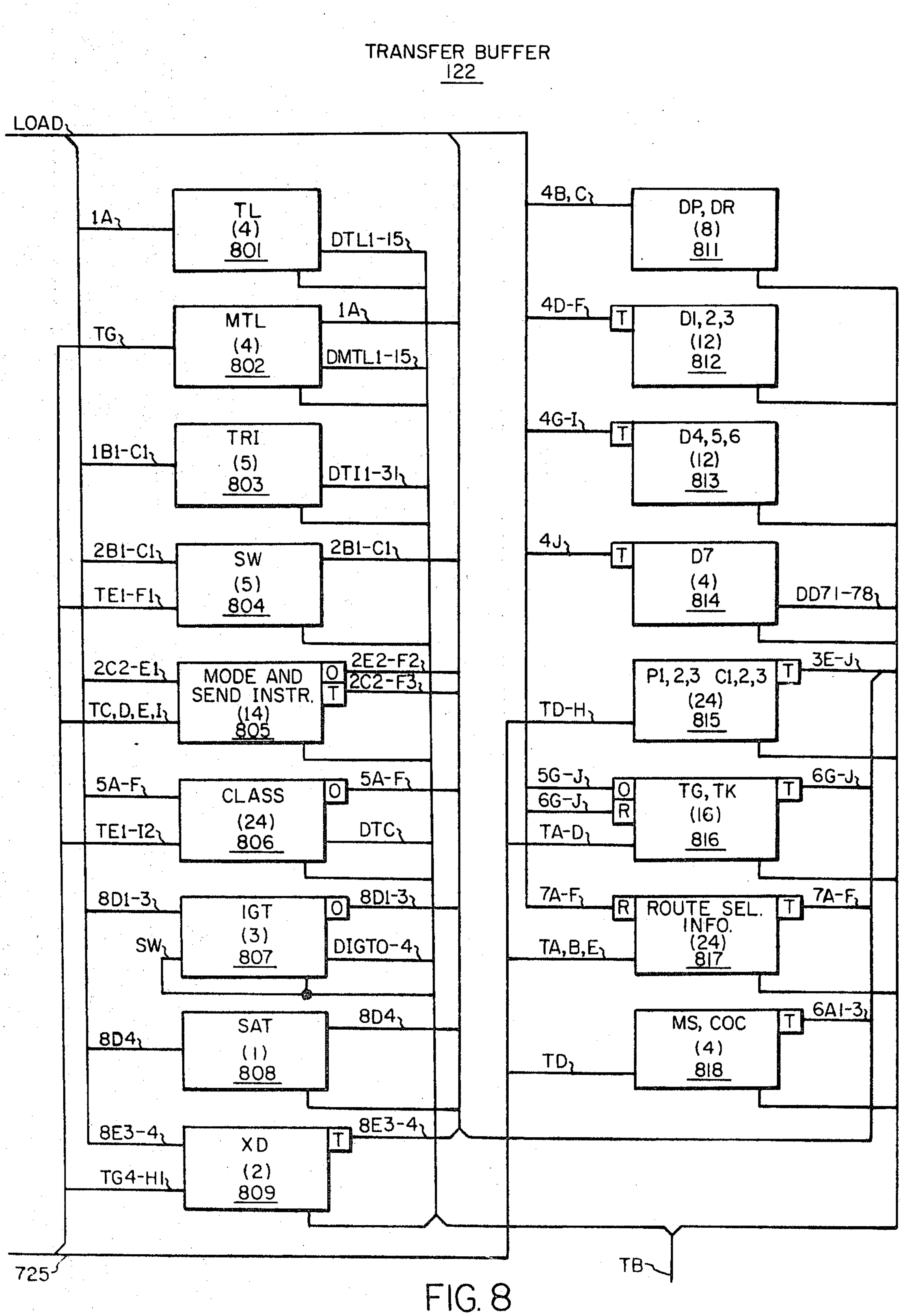
FIG. 8 is a more detailed block diagram of the transfer buffer block of FIG. 3.

The transfer buffer 122 shown in FIGS. 3 and 8 is a communication device between the register-sender subsystem and the translator and route selector subsystem. It comprises storage flip-flops and associated logic circuits. At the beginning of each translation information is received from the register-sender memory for the particular register junctor via the register read buffer 610 and the set of conductors LOAD into the flip-flops of the transfer buffer, this input being shown at the upper left of the blocks in FIG. 8, with a designation indicating the particular word store from which the information is received, followed by the portion of the word. During the translation and route selection processing information is loaded into these blocks from the translator route selector portion of the memory via the read buffer 620 and the set of conductors 725, these inputs being indicated at the lower left of the blocks in FIG. 8, with designations indicating the portion of the word transferred from the memory into the flip-flops. The flip-flops may also be set and reset in accordance with logic signals from other portions of the transfer buffer and from the translator and route selector 120 via the set of conductors TB. At the end of the translation, information from the transfer buffer flip-flops is transferred via the set of conductors DUMP to the register-sender subsystem, where it is written in memory via the process write circuits 111 and the write transfer circuits 800. These outputs from the flip-flops are shown in FIG. 8 at the upper right-hand side of each block, with a designation indicating the word store in the register junctor memory and the portion thereof to which the information is transferred. The information received from the register sender subsystem, may be received on all translations, on originating class mark and other translations pertaining to the originating line or trunk as indicated by O in the small box at the upper left of each block in FIG. 8, on code translations and other translations relating to the termination of the calls as indicated by a T, or on retranslations when the routing with the original translation route is unsuccessful as indicated by a R. The information dumped from the transfer buffer to the register sender subsystem may be transferred on all translations, on originating class mark translations only as indicated by a O at the upper right hand output, or on code translations and other relating to the termination of a call as indicated by a T.

Portions of the transfer buffer are omitted from FIG. 8 which relate to off-hook and abbreviated dialing, zone restriction, and other types of translation not of interest to the present invention. The number in parentheses in each block of FIG. 8 indicates the number of flip-flops therein.

Addressing digit buffers are shown in FIG. 8 by blocks 811—814. The precedence digit DP and the routing digit DR are stored in the eight flip-flops of block 811. These digits are received from word store 4 positions B and C of the register junctor memory on every translation. The dialed directory number digits are shown in FIG. 8 as digits D1—3 in block 812, digits D4—6 in block 813, and digit D7 in block 814. These digits are received for code translations from word store 4, positions D—J.

The prefix and code convert digits received from translator and route selector memory during translations are stored in block 815. The totals digit from word store 1 position A of the register junctor memory is stored in four flip-flops of block 801. There are 15 decoded outputs DTL1—15, which are used to control the number of addressing digits to be compared in the coincidence control.

Figure 11:
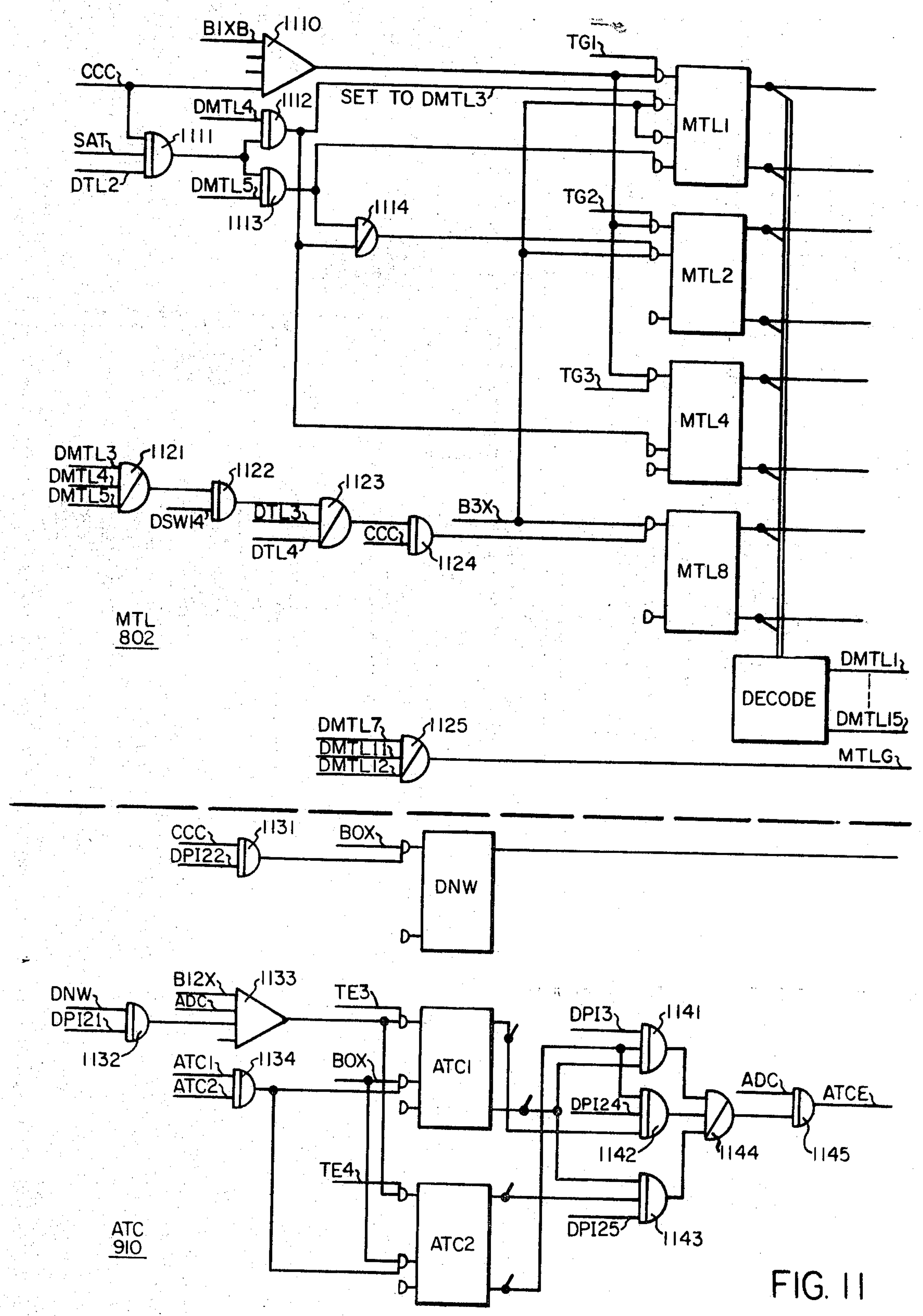

The memory totals digit MTL is stored in four flip-flops 802. Three of these bits are received from the translator memory position G, and the fourth is generated by logic circuits. A portion of the logic for this block is shown in FIG. 11. At the end of every translation the totals digit from block 802 is dumped into word 1 position A of the register junctor memory.

The initial totals digit received from the register subsystem on all code translations is DTL9, which is a request for a preliminary three-digit translation. On each code translation a new totals digit is read from the MTL digit on the word on which coincidence is found, into block 802 of the transfer buffer. A value of DMTL2 is an instruction to delete the three digits and return with three new digits for the next translation, which may occur for example if the home area code is dialed, and also on automatic traffic control calls. A value of DMTL3 indicates a three-digit translation for a seven-digit directory number; a value of DMTL4 indicates a three-digit translation for a 10-digit directory number; a value of DMTL5 indicates a six-digit translation for a 10-digit directory number, a value of DMTL6 indicates a six-digit translation for a seven-digit directory number, and a value of DMTL7 indicates sufficient digits to route.

Referring to FIG. 11, on certain tandem calls in which early cut-through is allowed, the switching digit has a value of DSW14, which is an input to gate 1122. On these calls, digits read from the code word store having values of DMTL3, DMTL4 or DMTL5 are increased by eight. This is accomplished when the signal CCC becomes true at gate 1124 via the logic of gates 1121—1124 to set the flip-flop MTL8. If the digit now has a value of DMTL7, DMTL11 or DMTL12, the signal MTLG from gate 1125 becomes true to cause the translation process to proceed to route selection, because there are sufficient digits to route. Thus on codes in which the memory totals digit is DMTL3 or DMTL4, the route selection is done with only three digits, and if early cut-through is allowed the value is changed to DMTL11 or DMTL12 for immediate routing. However, if all of the digits must be accumulated before routing, the instructions returned with the next code translation will have a totals digit of DTL3 or DTL4, which causes coincidence to occur on the same word. At this time the routing is to be completed, so the signal DTL3 or DTL4 via gate 1123 causes the MTL8 flip-flop to be set, so that the signal DTML11 or DMTL12 will generate the signal MTLG. When the totals digit read on the preliminary translation has a value of DMTL5, or DMTL6, the route selector requires six digits. On tandem early cut-through calls the value DMTL5 is changed to DMTL13. On these six digit translations the six-digit code is read from a different word store of memory than the original three-digit code, and the memory totals digit has a value of DMTL7, which via gate 1125 provides the signal MTLG for sufficient digits to route.

The memory totals digit is modified from DMTL4 to DMTL3 or from DMTL5 to DMTL6 on the second code translation via the logic 1110—1114, when an automatic traffic control call is being processed.

The translation instruction from the register junctor memory word store 1, bits B1—C1 is stored in five flip-flops TRI of block 803. These instructions are decoded with the value DTI1—31 to control the translator and route selector processing. The instruction may be modified during translation and route selection for such purposes as selection of announcement or busy tone trunks.

A switching digit is stored in five flip-flops SW of block 804. This digit is transferred from the register subsystem on every translation from word store 2 bits B1—C1. The digit may be modified during translation and route selection; for example during a class mark translation the digit is generated in accordance with information from the translator memory bits E1—F1 from a DPI8 word store of section seven.

The mode and send instruction flip-flops of block 805 store information relating to the pulsing mode and which digits to send. The send instructions are transferred from the register subsystem during the load cycle of every translation from word store 2, bits C2—E1. The information in these flip-flops may be also received from the translator and route selector portion of the memory positions C, D, E or I. On class mark translations the receive mode is dumped to the register subsystem word store 2, bits E2—F2. On code translations the send mode and sending instructions are dumped to word store 2, bits C2—F3.

The originating service treatment digit buffers for class of service information are in block 806. These flip-flops are originally loaded from section five of the translator memory and dumped into word store 5, positions A—F during class mark translations, and the information is received during the load cycle on all translations. Of particular interest for the present invention is the class of service of the traffic controller which is shown as a decoded output DTC.

The incoming group type IGT is stored in three flip-flops in block 807. This digit is stored from the register subsystem on every translation. The digit is set equal to the switching digit SW on a class mark translation, in accordance with the information derived from the DPI8 word in section seven for the originating line or trunk.

Figure 12:
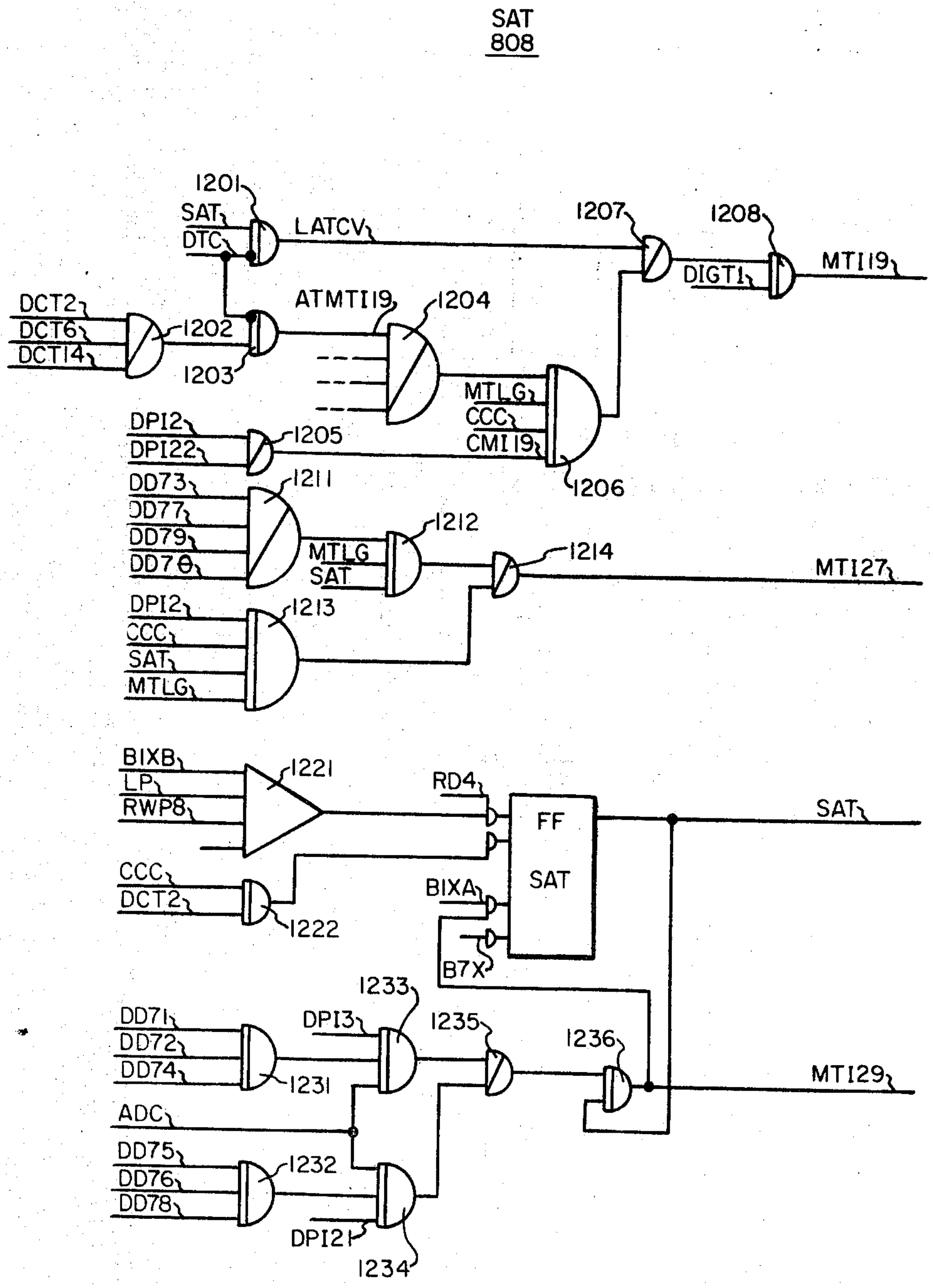

The flip-flop SAT, set automatic traffic control in block 808 is loaded and dumped from the register sender subsystem word store eight, bit D4 on every translation. It is initially set during a code translation for an automatic traffic control call The logic associated with this flip-flop is shown in FIG. 12, and is part of the traffic plan control apparatus.

The XD digit is stored in two flip-flops of block 809. This digit is transferred from the translator memory on a code translation when the code is located, and is dumped to word store 8, bits E3 and 4 of the register junctor memory.

Trunk identity flip-flops 816 include eight group identity flip-flops TG and eight trunk identity flip-flops TK. On a class mark translation the identity of the originating line or trunk is loaded from word store 5, positions G—J. During a code translation the group number or complete trunk number may be supplied from the translator memory from positions A and B or positions A—D, depending on the value of the route digit indicator RDI digit. At the end of a code translation the trunk identity is dumped to word store 6, positions G—J to supply the terminating trunk identity. On a retranslation this terminating identity is loaded from word store 6, positions G—J.

The route selection information is stored in 24 flip-flops of block 817. It includes eight flip-flops for a route sequence counter and two flip-flops RST and RSU for the tens and units values of a route sequence, eight flip-flops RNT and RNU for the tens and units values of a route number, three flip-flops for the route digit indicator RDI, three flip-flops RSC for a route sequence counter and two flip-flops RNC for a route number counter. Information is loaded into these flip-flops from a routing word store during code translation in accordance with the value of the route digit indicator digit RDI digit. The information is dumped at the end of a code translation to word store 7, positions A—F, and is returned in the case of a retranslation.

The flip-flops of block 818 comprises four flip-flops for a marker status digit, three of which are used for the class of call COC on calls to an operator position.

Other buffers for abbreviated dialing, zone restriction and so forth are not shown in FIG. 8.

TRANSLATOR AND ROUTE SELECTOR CONTROL

Figure 9:
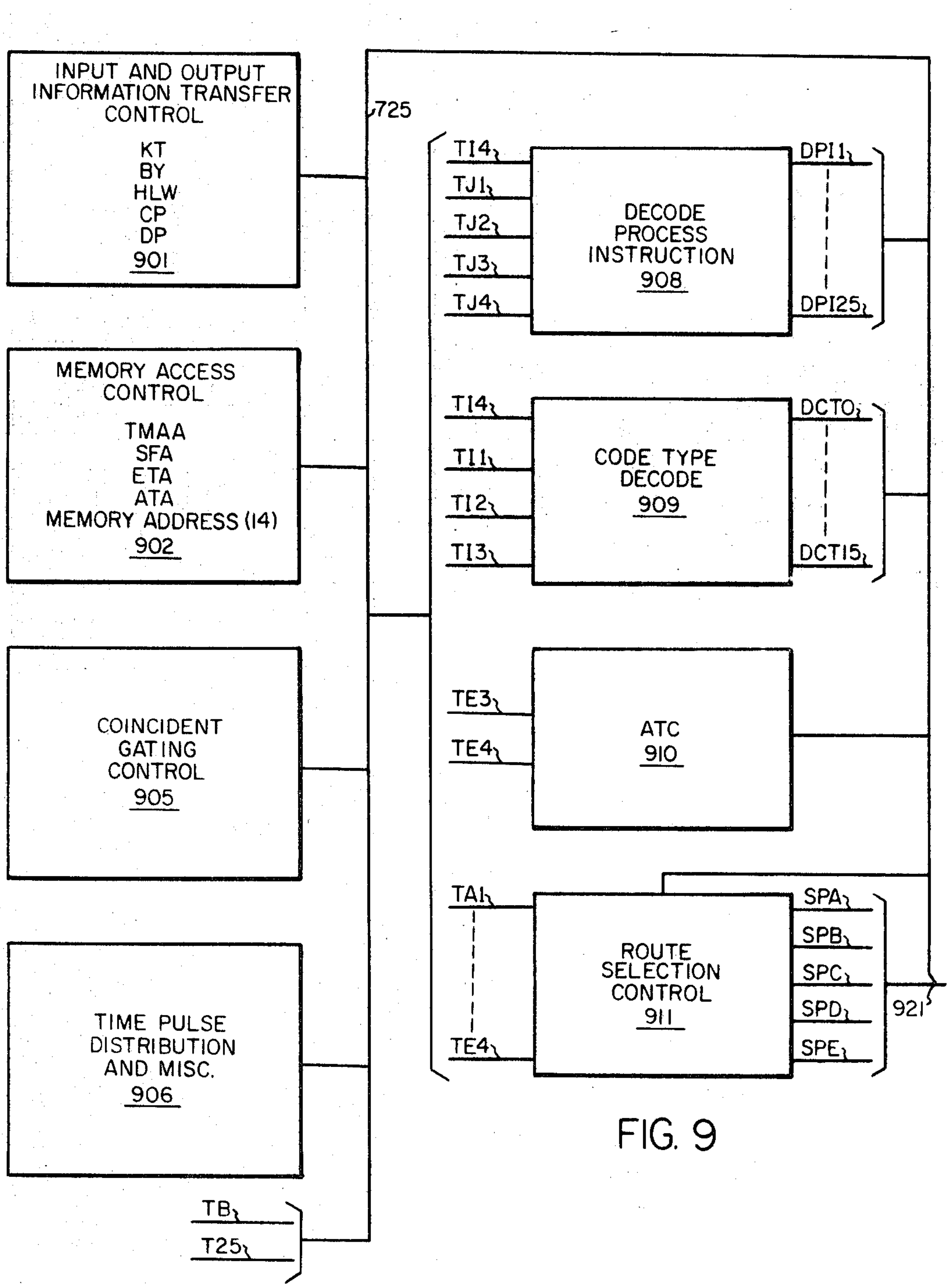
FIG. 9 is a more detailed block diagram of the translator and route selector block of FIG. 3.

The translator and route selector control flip-flops and logic 120, shown by a block diagram in FIG. 9, provides the controlling functions for the translation and route selection. It consists of logic functions for input and output information transfer control, memory access control, coincident gating control, route selection control, zone restriction control, traffic plan control, time pulse distribution and other miscellaneous controls and indicators.

The input and output information transfer control logic 901 is used at the beginning of every translation to load information from the register junctor memory into the translator and to dump information back to the register junctor memory at the end of a translation. There are five flip-flops to accomplish this function. Flip-flop KT, having key to the translator, can be set from the register sender subsystem logic in response to a request for service signal at the beginning of a translation, or in response to a signal received during the time slot of the junctor using the translator. Flip-flop BY, translator busy, is used to block other register junctors from accessing the translator while it is busy with a translation for one of them. The flip-flop HLW, have loaded register words, is used to prevent the reloading of a transfer buffer once it has been loaded from the register junctor memory. The flip-flop CP, complete, is used to indicate that a particular translation is completed. The flip-flop DP, dump into register, is used to control the transfer of information from the transfer buffer to the register junctor memory at the completion of a translation.

The memory access control 902 is to control the addressing and read and write pulses to the translator and route selector portion of memory. Flip-flop TMAA, translator memory access allowed, is used to control generation of the read and write pulses. Fourteen memory address flip-flops are used to store the address of a word, and together with the flip-flop ETA, enter translator address, enables the memory to be randomly accessed. The flip-flop ATA, advance translator address, is used to sequentially access the memory word stores for associative searches. The flip-flop SFA, strap field address, is used to gate a fixed address designating the beginning of the translator and route selector portion of the memory into the addressing flip-flops.

Figure 10:
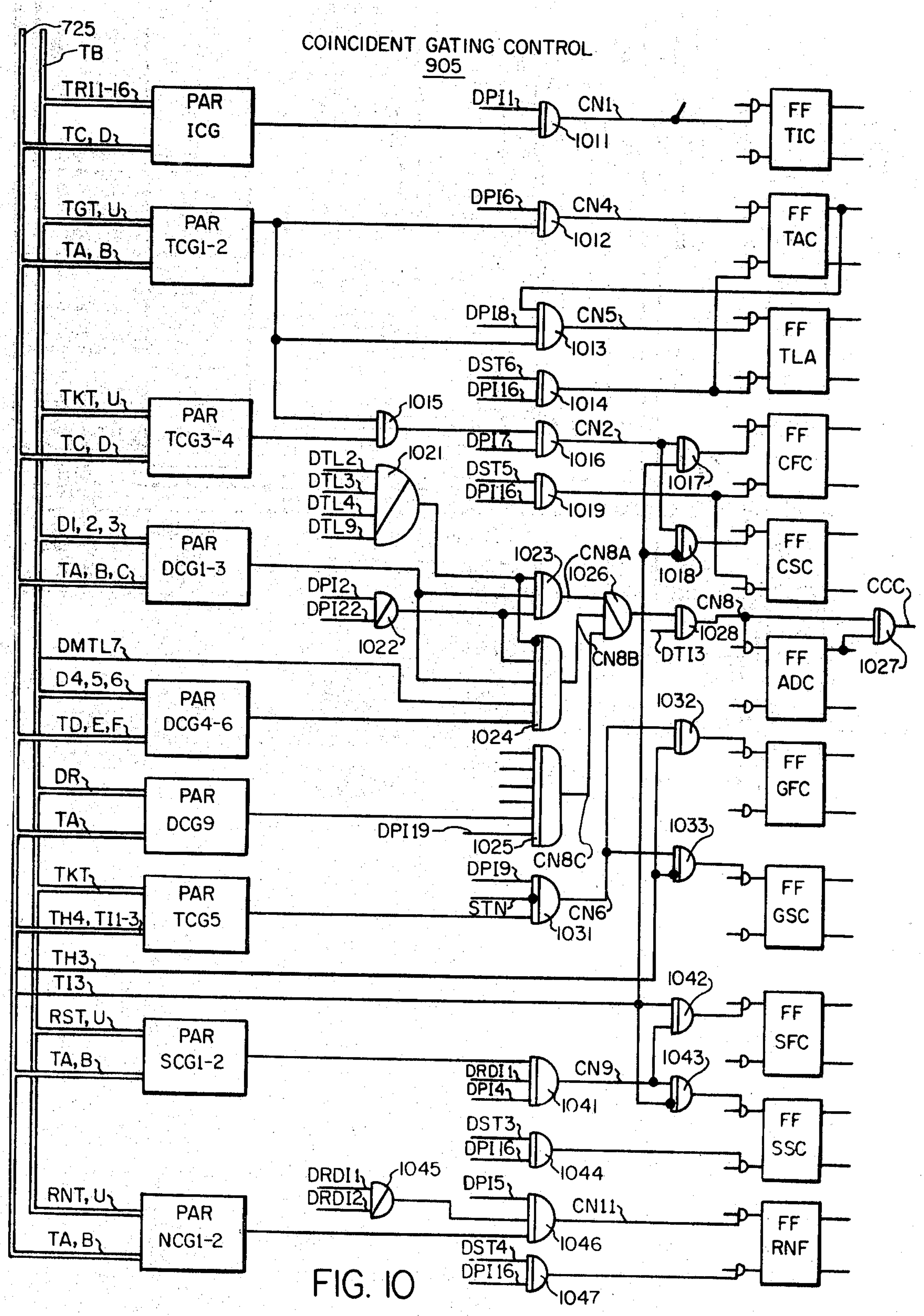
FIGS. 10—13 comprise functional block diagrams of various of the blocks shown in FIGS. 8 and 9.

The coincident gating control logic 905 comprises a number of comparison circuits and logic, shown in more detail in FIG. 10, to control the transfer of information from the translator and route selector portion of memory into the transfer buffer. The parity gates, indicated by PAR in FIG. 10, compare information from the translator and route selector portion of memory via the translator read buffer 620 and the set of conductors 725 (FIG. 3), against information from the transfer buffer 122 via the set of conductors TB, for associative searches.

The parity circuits ICG compare the signals from the translation instruction flip-flops TRI from block 803 with the information from positions C and D via the translator read buffer, and when coincidence occurs while reading a DPII word a signal CN1 is generated via gate 1011 to set the flip-flop TIC.

The parity circuits TCG1—2 compare the trunk group tens and units information from block 816 of the transfer buffer with the information from positions A and B via the translator read buffer. If this coincidence occurs while reading a DPI6 word the signal CN4 becomes true via gate 1012 to set the flip-flop TAC, and if the coincidence occurs while reading a DPI8 word from section seven after the flip-flop TAC has been set, then gate 1013 generates signal CN5 to set the flip-flop TLA. Each time the route selection enters section six as indicated by coincidence of the signals DST6 and DPI16 via gate 1014 these two flip-flops TAC and TLA are reset. The parity circuits TCG3—4 compare the information in the trunk tens and units flip-flops of block 816 with the information in positions C and D, and in conjunction with the output of parity circuits TCG1—2 via gate 1015 indicates coincidence of the four digits of an originating trunk number, which when read during a DPI7 word from the service treatment section five indicates that the class mark word for the originating line or trunk has been found to generated the signal CN2. This signal via the gales 1017 and 1018 sets either flip-flop CFC or CSC in accordance with whether the signal TI3 is true or false to indicate the first or the second class mark word. These flip-flops are set at the end of section five as indicated by coincidence of the signals DST5 and DPI16 via gate 1019.

Address digit comparisons are made by the parity circuits DCG1—3, DCG4—6, and DCG9, to set the flip-flop ADC. Parity circuits DCG1—3 compare the digits one, two and three from block 812 of the transfer buffer with the information from positions A, B and C via the translator read buffer. The parity circuits DCG4—6 compare the information from digits four, five and six from block 813 of the transfer buffer with positions D, E and F via the translator read buffer. The parity circuit DCG9 compares the routing digit from block 811 of the transfer buffer with the information from position A via the translator read buffer. Code comparisons are made during DPI2 or DPI22 words controlled via gate 1022. If the decoded totals digit from block 801 has a value of DTL2, DTL3, DTL4 or DTL9 to make the output of gate 1021 true, this indicates a three-digit code comparison to enable gate 1023, while other values enable gate 1024 for a six-digit comparison. When a three-digit comparison is found the signal CN8A from gate 1023 becomes true, and when a six-digit comparison is found the signal CN8B from gate 1024 becomes true. Route digit comparisons are made during DPI19 words, which along with other signals not shown enables gate 1025, so that when route digit coincidence is found signal CN8C becomes true. Any one of these coincidences via gate 1026 makes the signal CN8 true to set flip-flop ADC, following which the signal CCC from gate 1027 becomes true.

The parity circuit TCG5 is used to find coincidence on the trunk tens digit in the DP19 words of section seven, when the signal STN, select trunk next, is not true. The coincidence signal CN6 from the output of gate 1031 is applied via gates 1032 and 1033 to set the flip-flop GFC on the first of the two words as indicated by the signal TH3 being true, and to set the flip-flop GSC on the second word when the signal TH3 is false. The inputs to the parity circuit TCG5 are the trunk tens digit TKT from block 816, and the bits TH4 and TI1—3 from the translator read buffer.

The parity gates SCG1—2 and NCG1—2 are used for route sequence and route number associative searches, respectively. The inputs are from block 817 of the transfer buffer, and positions A and B from the translator read buffer. The route sequence searches are made when the route digit indicator has a decoded value of one and the processing instruction has a value of four, to supply a coincidence signal CN9 via gate 1041. This signal via gate 1042 sets flip-flop SFC on the first word for the sequence number when the signal T13 is true, and via gate 1043 on the second word sets flip-flop SSC in response to the signal T13 being false. The route number coincidence circuit NCG1—2 is examined when the decoded routing digit has a value of DRDI1 or DRDI2 for DP15 words via gates 1045 and 1046; the signal CN11 becoming true when coincidence is found to set the flip-flop RNF. When during the process of route selection, section three is entered, the signals DST3 and DPI16 via gate 1044 resets the flip-flops SFC and SSC, and when entering section four the signals DST4 and DPI16 via gate 1047 resets the flip-flop RNF.

To simplify the drawing much of the logic has been omitted from FIG. 10, for example the timing pulse signals at the inputs of the flip-flops, and much of the flip-flop reset logic. Also the circuits for functions such as abbreviated dialing and zone restriction coincidence have been omitted.

In FIG. 9 the block 906 represents the time pulse distribution and miscellaneous logic, which receives input signals from the address generator 500 and other circuits and controls the setting and resetting of the flip-flops during appropriate intervals of each cycle.

Blocks 908 and 909 show the decoding of the process instruction and the code type digit.

The block 910 represents the automatic traffic control flip-flops and logic, which is shown in more detail in FIG. 11. The flip-flop DNW, dump next word, is also shown. This flip-flop is set when code coincidence is found during a DPI22 word, to control the reading of the information from the following DPI21 word store. The item of particular interest in the DPI21 word is the ATC digit which controls the setting of the flip-flops ATC1 and ATC2.

The route selection control logic 911 is used to scan the status of the trunks in the DPI9 words of section seven. The status of five trunks at a time is read from positions A—E respectively, and if one or more of them is available for a call, a corresponding signal appears on one of the leads SPA—SPE for marking the trunk via the set of conductors 921 to the translator write circuit 121. This logic also controls the advancing to the testing of successive trunk groups upon finding all trunks busy in the earlier choice trunk groups.

TRANSLATOR WRITE

Figure 13:
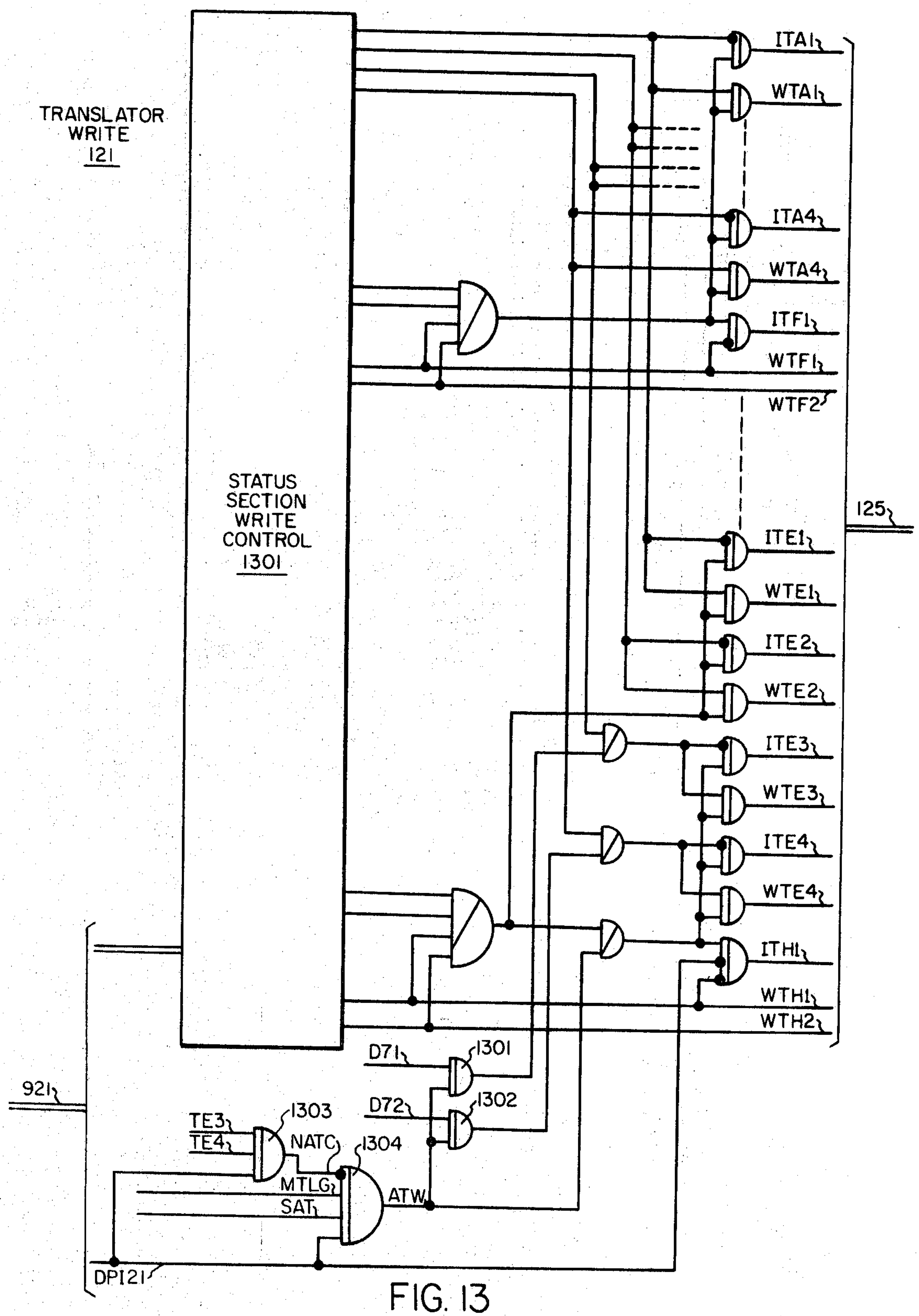

The translator write circuit 121 is shown in FIG. 13. Most of the information stored in the translator and route selector portions of the memory is of a semipermanent nature, and cannot be modified during call processing. The only exceptions are the busy-idle status indicators of the DPI9 words of section seven, and the ATC digits in the DPI22 words of the code translation section. In FIG. 13 the block 1301 represents the status section write control circuits which are shown and described in detail in said Trunk Scanner patent application. This logic may write into positions A—E for the five trunks respectively, and also in the bits F1—H2. The logic effective during calls from the traffic controller to modify the ATC digit in bits E3 and E4, which is part of the traffic plan control apparatus, is shown at the bottom of FIG. 13.

DETAILED OPERATION FOR CODE TRANSLATION

A call is described in the general description under the heading "General Operation of the System for a Typical Call." The operation of the translator and route selector during code translation will be described in detail.

At the end of the load cycle for the preliminary code translation, the totals digit DTL9 appears in the flip-flops of block 801, a translation instruction DTI3 is stored in block 803, an incoming group type DIGT1 for a local line is stored in block 807, the digits 414 are stored in block 812 and other information is stored in blocks such as 804 and 806. The strap field address for the first word of the translation instruction index section is in the address generator 500 (FIG. 3).

The flip-flop ATA (Advance translator address) of block 902 sets and causes the address to advance one step at a time through section one of the memory. When coincidence is found between the contents of the TRI flip-flops of block 803 and the information fed from positions C and D via the read buffer 620, the output of the parity circuit ICG becomes true; and the processing instruction DPI1 via gate 1011 causes the signal CN1 to become true to set the flip-flop TIC. The setting of this flip-flop denotes that there is translation instruction coincidence. The signal CN1 also causes the address from bits F1—I3 to be transferred into the 14 memory address flip-flops of block 902, after setting the flip-flop ETA (enter translator address). The new address setting is the start word of section two of the memory.

Section two of the memory has a DPI2 for the local automatic traffic control code word, followed by several DPI19 words for routing digit coincidence. It is assumed that no routing digit has been dialed. After again setting the flip-flop ATA, the translator address is stepped through the successive addresses of section two. After stepping through all of the DPI19 words without finding coincidence from the parity circuits DCG9 (FIG. 10), code coincidence is checked during the DPI2 and DPI22 words. Coincidence will be found at an address in which the digits 414 are stored in positions A—C, at which time the output of the parity gates DCG1—3 become true. The processing instruction will be DPI2 which via gate 1022 in conjunction with the totals digit DTL9 via gate 1021 enables gate 1023 to make the signal CN8A true, which in turn via gate 1026 makes the signal CN8 true to set the flip-flop ADC. Signal CCC via gate 1027 then also becomes true. Information is now read from that word store of memory into the transfer buffer, including an MTL digit in block 802, and an XD digit in block 809. In this case the memory totals digit will have a value DMTL5, indicating wait for storage of digits D1—D10 and take D1—D6 to the translator. This is all of the information required at this time. The code translation program is now terminated by setting the flip-flop CP in block 901. Flip-flop DP is set to cause the information to be dumped to the register junctor memory. In particular the totals digit is stored in word store 1, position A.

On the final translation the information loaded in the transfer buffer includes a totals digit having a value of DTL5, a translation instruction having a value DT13, dialed digits 414 loaded in block 812, and dialed digits 567 loaded in block 813.

On this translation, the process proceeds as on the first code translation, with the address advancing through the same words of the code translation section and continuing until the six-digit code coincidence is found from the parity gates DCG1—3 and DCG4—6. The memory totals digit read from this word store will have a value DMTL7, and the output of gate 1021 is false since the totals digit now has a value DTL5, so that gate 1024 is enabled to make the signal CN8B true, and via gate 1026 the signal CN8 true to set the flip-flop ADC, and make the signal CCC true.

It is assumed that coincidence is found in a DPI22 word, so that the flip-flop DNW is set via gate 1131 (FIG. 11), and the address is advanced one step to the DPI21 word. The output of gate 1132 in coincidence with the signal ADC enables the gated pulse amplifier 1133 to supply AC pulses to the flip-flops ATC1, ATC2, and other flip-flops not shown which are loaded from the DPI21 word store. In this case it is assumed that the normal plan routing is in effect so that the ATC digit has a value of zero, which means that the signals TE3 and TE4 are both zero (binary 00), so that the flip-flops ATC1 and ATC2 remain in the reset condition. When the address generator steps to the next DPI3 word, the output of gate 1141 is true. This signal via gate 1144 in coincidence with the signal ADC enables gate 1145 to generate the signal ATCE, which indicates that the routing word has been found. If plan one routing were in effect the ATC digit having the value of one (binary 10) would enable gate 1142 during a DPI24 word, and if the plan two routing were in effect the ATC digit value of two (binary 01) would enable gate 1143 during the DPI25 word. An ATC digit value of three (binary 11) also indicates the normal plan, and is changed to zero (binary 00) by resetting flip-flops ATC1 and ATC2 via gate 1134.

The DPI3 word is assumed to have a routing digit indicator from bits E1—3 having a value of DRDI2, which indicates that positions A and B contain a route number. This number is loaded into the route number flip-flops of block 817, along with the route digit indicator value.

With a route digit indicator value of DRDI2, the translation proceeds to route selection by entering section four. The ATA flip-flop is set and the address advanced until coincidence is found between positions A and B of memory and the route sequence number from the RNT and RNU flip-flops of block 817. The output of the parity circuit NCG1—2 becomes true, which in coincidence with the processing instruction DPI5 and the routing instruction DRDI2 via gates 1045 and 1046 generates the signal CN11 to set the flip-flop RNF. This signal CN11 also advances a route number counter in the block 817. The number of the first trunk group from positions C and D as read into the TG flip-flops of block 817, which with a normal plan is trunk group 33.

The translation advances to the end of section four where the address of the start of section five is found. At that word store the address of the end of the section is obtained, and there the start address of section six is found. In section six the translation address is stepped until coincidence is found for the trunk group via the parity circuits TCG1—2. Since this is a DPI6 word, signal CN4 comes true via gate 1012 to set the flip-flop TAC. This word contains the start address of the trunk group, which is entered into the 14 flip-flops of block 902, and the flip-flop ETA is set.

The translator address is now set to the DPI8 trunk group word in section seven. Various information is read from this word store for processing, and then the address flip-flop ATA is set to advance the address through the DPI9 words to find an idle trunk.

The route selection control circuits 911 check the busy-idle status of the five trunk in each DPI9 word. It had been assumed that all trunks are busy in this group, so the translator continues to advance until it reaches a DPI11 word. The section four start word address from bits F2—I3 is entered in the address flip-flops of apparatus 902, and the flip-flop ETA is set to return to section four for the number of the next trunk group. The flip-flop ATA is set to advance through the route number section to again find coincidence with the route number on a DPI5 word. Since the route number counter has been advanced one step, the trunk group B from positions E and F is now selected and its identity transferred into the TG flip-flops of block 816. The route selection process now proceeds to section six as before to find the word having this new trunk group, and then transfers to the corresponding group address in section seven. In the first DPI9 word of the group the route selection control circuit 911 finds that the trunk having the equipment number 3200 is idle and accordingly generates a true signal on the lead SPA. This signal is supplied to the status section write control circuits 1301 in the translator write circuit 121, to cause the appropriate terminating busy signal to be written into position A of the DPI9 word store, and seizure bit F1 is also set. Also the trunk tens and units numbers TKT and TKU are supplied to block 816 to complete the identification of the selected trunk. See said Trunk Scanner patent application for further details of the apparatus 1301.

The translator address continues to advance to the DPI10 word. This word contains the sending instructions which are transferred into block 805, and may also contain prefix digits P1—3 which if present are transferred into block 815.

The flip-flop CP is now set to terminate the translation and route selection process. The flip-flop DP is set, which causes the information from the transfer buffer to be dumped to the register junctor memory. The flip-flops of the translator and route selector and the transfer buffer are then reset and returned to the idle state.

AUTOMATIC TRAFFIC CONTROL - DETAILED DESCRIPTION

The ATC digit of the DPI21 word of a single code or a group of codes may be modified from a special traffic controller station 11 (FIGS. 1 and 2). This station is on one of the local lines of one of the switches 312-562. The ATC digit may be modified both within that switch and in a number of other switches within the numbering plan area. Each switch at which this modification may take place is assigned a special three-digit switch code beginning with a "1," in addition to its regular switch code. For example switch 312-379 has the code 124. The service treatment mark of the traffic controller line is assigned a value indicated herein as DTC from block 806 (FIG. 8). The dialed digit pattern from the traffic controller for modification of the ATC digits requires a total of 12 or 13 dialed digits. The first digit, which may be omitted, is the priority digit. The second and third are a "1" followed by the R digit, the next three are the special code designating the switch in which the modification is to be effected, the next six digits designate the code or group of codes for which the ATC digit is to be modified, and the last is a Z digit. The six digits designating the switch code to be modified may be a three-digit area code followed by a three-digit switch code or it may be a three-digit area code or three-digit switch code which is repeated.

The operation in the translator for a call from the automatic traffic control station proceeds as a normal call for the class mark and priority upgrade translations.

On the first code translation, indicated by a decoded translation instruction DTI3, the three digits of the special traffic control switch code which are in the dialed digit stores D1, D2 and D3 are compared with the three digits read from positions A, B and C of the memory as for a normal call. Referring to FIG. 10, signal CN8A from gate 1023 becomes true and via OR gate 1026 supplies signal CN8 which in coincidence with the signal DTI3 at gate 1028 supplies a signal to set the flip-flop ADC. Then the signal from gate 1027 also in coincidence with the signal ADC makes the signal CCC true.

Class Mark Verification

The word in which coincidence is found will be a DPI2 word in which the code-type digit CT from bits H4—I3 has a decoded valve of DCT2, DCT6 or DCT14 indicating an ATC code. The code type DCT2 is the local ATC code, and code types DCT6 and DCT14 are tandem or outgoing ATC codes. A check is performed to verify whether of not the call originated at the traffic controller line. This class mark is shown as DTC from block 806. When this signal is true it inhibits gates 1201 and 1203 (FIG. 12). Gate 1202 has inputs which enable the gate when the code type digit CT has decoded values of DCT2, DCT6 or DCT14. Thus if one of the automatic traffic control types is true and the signal DTC is false, indicating that the call was not originated at the automatic traffic control line, an output signal ATMTI19 from gate 1203 is true, which will cause the translation instruction to be modified to DTI19. For the local ATC code, the flip-flop SAT is set and the output thereof in coincidence with DTC false via gate 1201 generates a signal LATCV indicating a local automatic traffic control violation.

The violation is checked only on a local originating call, as indicated by the signal DIGT1 from block 807 (FIG. 8) being true. This value is originally supplied during the originating class mark translation DTI1, from the switching digit value in block 804, which in turn is derived from the group type digit in bits E1—F1 of the group DPI8 word in section seven of the memory. When this word is read during the class mark look up, the coincidence signal CN5 from gate 1013 is true, and this signal in coincidence with the signal DTI1 and an originating group-type word read from the memory enables gates in block 804 to generate the local originating call switching digit value.

Returning to the violation check during the code translation for the automatic traffic control call; if the code-type digit has a value of DCT6 or DCT14, indicating a tandem or outgoing call, the totals digit read from that word store will have a value DMTL7, which via gate 1125 generates the sufficient-to-route signal MTLG. A signal CMI19 becomes true at the output of gate 1205 in response to the signal DPI2. The signal ATMTI19, which as noted above is true if there is a violation on an outgoing automatic traffic control call, is supplied via gate 1204 to gate 1206. This signal in coincidence with the signals MTLG, CCC and CMI19 generates a true signal at gate 1206, which via OR gate 1207 is supplied to enable gate 1208. Thus either the output from gate 1206 in response to the violation signal ATMTI19, or the local violation signal LATCV, is supplied via gate 1207 which in coincidence with the local originating signal DIGT1 enables gate 1208 to generate the signal MTI19 as true. The signal MTI19 is supplied to block 803 to set the translation instruction store flip-flops to a value of DTI19. Upon loading the modified translation instruction, the strap field address flip-flop SFA in block 902 is also set, which sets the enter translator address flip-flop ETA. The address flip-flops in block 902 are loaded with the strap field address.

The translator looks for the translation instruction DTI19 in section one of the memory and obtains from that word the identity of the trunk group for the violation announcement trunk, following which the translation proceeds to cause the connection to be completed to a trunk in that group.

Execution of Traffic Control Modification

At the office at which a call from the automatic traffic control station is to be executed, whether originated locally or from another office, after the call proceeds to the first code translation and coincidence is found on the digits D1, D2 and D3, on a DPI2 word, the code coincidence word indicator signal CCC becomes true. The code-type digit TH4—TI3 has a value of DCT2. In response thereto the flip-flop SAT is set via gate 1222 (FIG. 12).

The memory totals digit read from this word store has a value of DMTL2, which informs the register-sender to delete the three digits D1, D2 and D3 and to wait for and take digits D1 through D3 for the next translation. The flip-flop CP (complete) is set in block 901 to complete the translation.

On the next code translation, when coincidence is found in the memory with the three-digit dialed code, the translator determines whether a three-digit code or a six-digit code is to be affected.

The three-digit dialed code in D1, D2 and D3 is the regular three-digit area of switch code. The memory totals digit has a value which indicates the number of digits to be accumulated and the number of digits to be used in looking for code coincidence on the next translation. However it is desired that digits up through and including D7 be accumulated, therefore for a three-digit translation the memory totals digit should be modified to a value of DMTL3, and for a six-digit translation it should be modified to have a value of DMTL6. This is done via gates 1110—1114 (FIG. 11). During this translation the totals digit from the register-sender has a value of DTL2, which along with SAT and CCC enables gate 1111. Signal CCC also enables gated pulse amplifier 1110 to supply a pulse to the flip-flop input gates. Gate 1111 enables gates 1112 and 1113, which supply the appropriate DC inputs.

On the last code translation, upon dialed code coincidence with the memory during a DPI22 word, the translator writes into the automatic traffic control indicators according to the Z digit.

Upon finding coincidence the signal CCC again becomes true. The memory totals digit read from the corresponding DPI22 word store for a six-digit translation will have a value of DMTL7. For a three-digit translation it has a value of DMTL3 or DMTL4, in which case the flip-flop MTL8 should be set to change the value to DMTL11 or DMTL12. This is done via gates 1123 and 1124.

The signal condition (DMTL7 + DMTL11 + DMTL12) at gate 1125 indicates sufficient to route and generates the signal MTLG.

The translator address then advances to read the next word, which is the DPI21 word.

In the translator write circuit 121 (FIG. 13), the Z digit, which is in the transfer buffer digit D7 store (block 814), is used to write the new value of the ATC digit in bits E3 and E4. A signal ATW is generated via gate 1304 upon coincidence of MTLG, SAT and NATC.

The signal NATC is from gate 1303. It is generated during each DPI21 word in response to the ATC digit having a binary value 11 (TE3 and TE4 both true), which designates that the normal plan routing Z"used and cannot be modified by the automatic traffic control call.

Z digits equal to 1, 2 or 4 designate that the ATC digit should be written for all of the DPI21 words to the end of a code group; while Z digits equal to 5, 6 or 8 designate that the ATC digit should be written for the particular DPI21 word corresponding to the dialed code only. Z digits equal to 3, 7, 9 or 10 will cause routing to an announcement trunk, since these values are not used. The Z digits 1 and 5 designate to write ATC digit 1 (binary value 10), the Z digits 2 and 6 designate to write the ATC digit 2 (binary value 01), and the Z digits 4 and 8 designate to write the ATC digit for plan normal (binary value 00). Note that the ATC digit to be written corresponds to the first two bits of the Z digit as shown in the following table.

| | Z digit binary | ATC digit binary |
|---|---|---|
| Z digit decimal: | | |
| 1 | 1000 | 10 |
| 2 | 0100 | 01 |
| 4 | 0010 | 00 |
| 5 | 1010 | 10 |
| 6 | 0110 | 01 |
| 8 | 0110 | 00 |

Whenever the signal SAT is true it inhibits setting the XD digit flip-flops in block 809, and inhibits loading sending instructions in block 805 (FIG. 8).

At the end of the write command or commands the translator generates a new translation instruction to route the traffic control call to an announcement trunk. The new translation instruction has a value DTI29, produced in response to the signal MTI29 from gate 1236 (FIG. 12). The value of the decoded Z digit is supplied from block 814. The signal MTI29 is generated in response to the coincidence of the signals SAT, ADC, and the completion of the write commands. For a Z digit having a value of 5, 6 or 8 (DD75 + DD76 + DD78), only the word store corresponding the single dialed code is to have the ATC digit written into, so that the command is generated in response to the signal DPI21 at gate 1234. For other values of the Z digit, which will be 1, 2 or 4 (DD71 + DD72 + DD74), the ATC digit is to be written to the end of the code group, as indicated by a DPI3 word, via gate 1233. The signal MTI29 resets flip-flop SAT. The translation is completed as described in the section on modified translation instructions. The announcement informs the traffic controller that the instructions have been executed.

We claim:

1. In a communication switching system having a plurality of terminations, and a switching network for selectively connecting a calling termination to one of the others in accordance with a call-directive code comprising digits of signals received via the calling termination;

translation and routing means including a plurality of code translation stores (DPI2 and DPI22—DPI21 words, FIGS. 5 and 6), each individual to a call directive code, a plurality of route selection control stores (DPI3, DPI24 and DPI25 words) which store information effectively designating terminations and an order of perference thereof, means associating code translation stores with route selection control stores, means to receive digits of a call directive code, means using said received digits to select the corresponding code translation store, means to select an associated route selection control store, means to select a termination in accordance with the information from the route selection control store, and means to supply the identity of the selected termination to equipment which operates the switching network to connect the calling and selected terminations;

wherein at least some of said code translation stores include storage devices storing a traffic plan digit (ATC in DPI21 words) having a plurality of possible values, with the terminations designated and their order of preference for the code being according to one of a plurality of predetermined plans in respective route selection control stores, one of which is selected dependent on the value of said traffic plan digit; and traffic plan control means to selectively modify the respective values of the traffic plan digits of at least some of the code translation stores.

2. In a communication switching system, the combination as claimed in claim 1, wherein said traffic plan control means includes a traffic control station, means to supply digital information from the traffic control station to said translation and routing means, and traffic plan control apparatus in the translation and routing means to analyze the digital information from the traffic control station to identify a code translation store and a traffic plan digital value, and to modify the value of the traffic plan digit in said code translation store to that value.

3. In a communication switching system, the combination as claimed in claim 2, wherein said code translation stores are organized into sets, each comprising one or more of the code translation stores, each said set being associated with at least one of the said route translation stores, some of the sets being associated with a plurality of the route selection control stores, wherein different possible values of the traffic plan digit of each code translation store of the set identify different ones of the associated route selection control stores.

4. In a communication switching system, the combination as claimed in claim 3, wherein the traffic plan control apparatus of the translation and routing means is arranged to modify the value of the traffic plan digit of only one code translation store, or alternatively of all of the code translation stores of a set, depending on the digital information received from the traffic control station.

5. In a communication switching system, the combination as claimed in claim 4, wherein one of said terminations is a traffic control termination, wherein said traffic control station is connected to the last said termination, and wherein the digital call information for calls from the traffic control station via its termination is received in the translation and routing means in the same manner as for normal calls via other terminations, the translation and routing means including means to recognize a special class of service for the traffic control termination to permit actuation of the traffic plan control apparatus.

6. In a communication switching system, the combination as claimed in claim 5, wherein the format of the digital information for calls from the traffic control station comprises:

a special digital code identifying a store containing information for actuating the traffic plan control apparatus, digital code identifying one of said code translation stores; and a digit indicating the new value for the traffic plan digit, and also identifying whether the traffic plan digit is to be modified to that value in only the one code translation store, or also in all of the following code translation stores of the set.

7. In a communication switching system, the combination as claimed in claim 6, wherein said apparatus includes means which responsive to completion of the modification of the traffic plan digits causes initiation of selection of a termination to a "completion" announcement trunk.

8. In a communication switching system, the combination as claimed in claim 6, wherein said apparatus includes means responsive to a call in which the received digital information includes a format having said special code, but in which said special class of service is not recognized, to initiate selection of a termination to a "violation" announcement trunk.

9. In a communication switching system, the combination as claimed in claim 6, wherein there are a plurality of switching centers which are individually identified by respective ones of said special codes of said format, wherein said traffic control station is connected to a termination of one of these switching centers, which is the originating switching center for traffic control calls, and calls therefrom are routed to a terminating switching center corresponding to the special code, where the traffic plan control apparatus is actuated to modify the traffic plan digits.

10. In a communication switching system, the combination as claimed in claim 9, wherein the traffic plan control apparatus at the originating switching center includes means to check for said special class of service, and for calls having the format with one of said special codes but originating from other than said traffic control termination, to route the call to a violation announcement trunk.

11. In a communication switching system, the combination as claimed in claim 10, wherein the traffic plan control apparatus at said terminating switching center, upon completion of the modification of traffic plan digits, initiates selection of a termination to a "completion" announcement trunk.

12. In a communication switching system, the combination as claimed in claim 1, wherein said translation and routing means includes a memory comprising a plurality of word stores, each word store having a plurality of storage devices and each having an address individual thereto, there being address means providing access to one word store at a time, either randomly or sequentially; and wherein each of said code translation stores comprises at least one word store of the memory, and each of said route selection control stores comprises at least one word store of the memory.

13. In a communication switching system, the combination as claimed in claim 12, wherein said traffic plan control means includes a traffic control station, means to supply digital information from the traffic control station to said translation and routing means, and traffic plan control apparatus in the translation and routing means to analyze the digital information from the traffic control station to identify a code translation store and a traffic plan digital value, and to modify the value of the traffic plan digit in the memory word for said code translation store.

14. In a communication switching system, the combination as claimed in claim 13, wherein said code translation stores are organized into sets comprising word stores at successive addresses in the memory, each set comprising one or more of the code translation stores, each said set being associated with at least one of said route selection control stores which have addresses which follow successively after the code translation stores of the set, wherein different possible values of the traffic plan digits of each code translation store of a set identify different ones of the associated route selection control stores.

15. In a communication switching system, the combination as claimed in claim 14, wherein the traffic plan control apparatus of the translation and routing means is arranged to modify the value of the traffic plan digit of only one code translation store, or alternatively of all of the code translation stores of a set. depending on the digital information received from the traffic control station.

16. In a communication switching system, the combination as claimed in claim 15, wherein one of said terminations is a traffic control termination, and wherein said traffic control station is connected to the last said termination, and wherein the digital call information for calls from the traffic control station via its termination is received in a translation and routing means in the same manner as for normal calls via other terminations, the translation and routing means including means to recognize a special class of service for the traffic control termination to permit actuation of the traffic plan control apparatus;

wherein the format of the digital information for calls from the traffic control station comprises:

a special digital code identifying a word store containing information for actuating the traffic plan control apparatus;

a digital code identifying one of said code translation stores; and a digit indicating the new value for the traffic plan digit, and also identifying whether the traffic plan digit is to be modified to that value in only the one code translation store, or also in all of the following code translation stores of the set.

17. In a communication switching system, the combination as claimed in claim 12, wherein said translation and routing means comprises processing apparatus and said memory, wherein said traffic plan control means includes traffic plan control apparatus which is a portion of said processing apparatus;

and wherein each word store of said memory includes storage devices storing a process digit which identifies the type of word and indicates to the processing apparatus what processing action to take with respect to the other digital information read from that word store.

18. In a communication switching system, the combination as claimed in claim 17, wherein said code translation stores are organized into sets, each set comprising one or more of the code translation stores, each set comprising word stores having successive addresses, each set being associated with at least one of the route translation stores, which have addresses successively following the code translation store addresses of the set, some of the sets being associated with a plurality of the route selection control stores which have successive addresses; wherein different possible values of the traffic plan digit of each code translation store of the set identify different ones of the associated route selection control stores, each route selection control store associated with a set having a different value of the process digit, each value of the traffic plan digit corresponding to a value of a route selection control word process digit, wherein the processing apparatus includes bistable devices to store the traffic plan digit value of a selected code translation store, and to select a route selection control store having a corresponding value of the process digit.

19. In a communication switching system, the combination as claimed in claim 18, wherein one of said terminations is a traffic control termination connected to a traffic control station, wherein digital call information for calls from the traffic control station via its termination is received in the translation and routing means in the same manner as for normal calls via other terminations, the translation and routing means including means to recognize a special class of service for the traffic control termination to permit actuation of the traffic plan control apparatus;

wherein the format of the digital information for calls from the traffic control station comprises:

a special digital code identifying a store containing information for actuating the traffic plan control apparatus, a digital code identifying one of said code translation stores, and a digit indicating the new value of the traffic plan digit, and also identifying whether the traffic plan digit is to be modified to that value in only one code translation store, or also in all of the following code translation stores of the set.

20. In a communication switching system, the combination as claimed in claim 18, wherein there are a plurality of trunk groups, each comprising a plurality of trunks, each trunk having an individual one of said terminations; and wherein each of the route selection control stores includes storage devices storing a route digit indicator digit and other storage devices which store information which may designate a single trunk group or a given plurality of trunk groups, depending on the value of the route digit indicator digit, and a given order of preference for the trunks groups to designate a primary route and alternate routes.

21. In a communication switching system, the combination as claimed in claim 20, wherein said traffic plan control means includes a traffic control station, means to supply digital information from the traffic control station to said translation and routing means, and traffic plan control apparatus in the translation and routing means to analyze the digital information from the traffic control station to identify a code translation store and a traffic plan digital value, and to modify the value of the traffic plan digit in that code translation store to that value.

22. In a communication switching system, the combination as claimed in claim 21, wherein one of said terminations is a traffic control termination, wherein said traffic control station is connected to the last said termination, and wherein digital call information for calls from the traffic control station via its termination is received in the translation and routing means in the same manner as for normal calls via other terminations, the translation and routing means including means to recognize a special class of service for the traffic control termination to permit actuation of the traffic plan control apparatus.

23. In a communication switching system, the combination as claimed in claim 22, wherein the traffic plan control apparatus of the translation and routing means is arranged to modify the value of the traffic plan digit of only one code translation store, or alternatively of all of the code translation stores of a set, depending on the digital information from the traffic control station.

24. In a communication switching system, the combination as claimed in claim 23, wherein the format of the digital information for calls from the traffic control station comprises:

a special digital code identifying a store containing information for actuating the traffic plan control apparatus;

a digital code identifying one of said code translation stores; and a digit indicating the new value for the traffic plan digit, and also identifying whether the traffic plan digit is to be modified to that value in only the one code translation store, or also in all of the following code translation stores of the set.

25. In a communication switching system, the combination as claimed in claim 24, wherein said memory includes a traffic plan translation code store identified by said special digital code, which store includes stored information which causes a bistable device in said traffic plan control apparatus to be set indicating a traffic plan call in process.

26. In a communication switching system, the combination as claimed in claim 25, wherein said means to selectively modify the respective values of the traffic plan digits comprises means to write into the devices storing the traffic plan digits of the code translation stores identified by the digital code of said format and also into succeeding code translation stores if so designated by said digit indicating the new value.

27. In a communication switching system, the combination as claimed in claim 26, wherein a normal routing plan is designated by two values of the traffic plan digit, and wherein the traffic plan control apparatus includes means to inhibit modification of a traffic plan digit responsive to its having a given one of said two normal values.

28. In a communication switching system, the combination as claimed in claim 26, wherein there are a plurality of switching centers which are individually identified by respective ones of said special codes of said format, wherein said traffic control station is connected to a termination of one of these switching centers, which is the originating switching center for traffic control calls, and calls therefrom are routed to a terminating switching center corresponding to the special code, where the traffic plan control apparatus is actuated to modify the traffic plan digits.

29. In a communication switching system, the combination as claimed in claim 28, wherein the code translation stores having a traffic plan digit comprise two word stores, with the traffic plan digit stored in the storage devices of the second word store thereof.